US011495822B2

(12) United States Patent
Okui

(10) Patent No.: US 11,495,822 B2
(45) Date of Patent: Nov. 8, 2022

(54) STACK STRUCTURE OF FUEL CELL AND METHOD OF ABSORBING THERMAL DEFORMATION IN FUEL CELL STACK

(71) Applicant: NISSAN MOTOR CO., LTD., Yokohama (JP)

(72) Inventor: Takehiko Okui, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 190 days.

(21) Appl. No.: 16/637,132

(22) PCT Filed: Aug. 10, 2017

(86) PCT No.: PCT/JP2017/029208
§ 371 (c)(1),
(2) Date: Feb. 6, 2020

(87) PCT Pub. No.: WO2019/030920
PCT Pub. Date: Feb. 14, 2019

(65) Prior Publication Data
US 2020/0251766 A1    Aug. 6, 2020

(51) Int. Cl.
*H01M 8/2475* (2016.01)
*H01M 8/248* (2016.01)
*H01M 8/2484* (2016.01)

(52) U.S. Cl.
CPC ......... *H01M 8/2484* (2016.02); *H01M 8/248* (2013.01); *H01M 8/2475* (2013.01)

(58) Field of Classification Search
CPC .. H01M 8/2484; H01M 8/2475; H01M 8/248; H01M 8/249; H01M 8/2432; H01M 2008/1293; Y02E 60/50
See application file for complete search history.

(56) References Cited

U.S. PATENT DOCUMENTS

| 6,270,917 | B1 | 8/2001 | Maeda et al. | |
|---|---|---|---|---|
| 6,692,859 | B2* | 2/2004 | Mukerjee | H01M 8/2485 |
| | | | | 429/459 |
| 9,318,758 | B2 | 4/2016 | Shinohara et al. | |
| 2003/0235742 | A1* | 12/2003 | Bobrov | H01M 8/2484 |
| | | | | 429/470 |
| 2008/0138684 | A1 | 6/2008 | Lewinski et al. | |
| 2009/0004533 | A1 | 1/2009 | Tanaka et al. | |
| 2014/0141351 | A1* | 5/2014 | Shinohara | H01M 8/0258 |
| | | | | 429/457 |
| 2015/0099205 | A1 | 4/2015 | O'Neill et al. | |
| 2018/0342742 | A1 | 11/2018 | Dristy et al. | |

FOREIGN PATENT DOCUMENTS

| JP | 64-76682 A | 3/1989 |
|---|---|---|
| JP | 6-333591 A | 12/1994 |
| JP | 10-106610 A | 4/1998 |
| JP | 2000-268843 A | 9/2000 |
| JP | 2006-108058 A | 4/2006 |
| JP | 2008-103166 A | 5/2008 |
| JP | 2013-20886 A | 1/2013 |
| JP | 2013-54918 A | 3/2013 |
| WO | WO-2017/040625 A1 | 3/2017 |

* cited by examiner

*Primary Examiner* — Muhammad S Siddiquee
(74) *Attorney, Agent, or Firm* — Foley & Lardner LLP

(57) ABSTRACT

Stacked bodies each formed by alternately stacking power generation cells and separators are fixed to an end plate, the separators each having a flow passage portion, a gas flow-in port, and a gas flow-out port. The end plate includes upper and lower end plates sandwiching the stacked bodies. The stacked bodies are arranged side by side and a first thermal deformation absorbing portion configured to absorb thermal deformation in a direction orthogonal to a stacking direction is formed between the stacked bodies. Fixing means for fixing the stacked bodies to the end plate fix at least outer peripheral portions of the stacked bodies arranged side by side to the end plate.

10 Claims, 21 Drawing Sheets

STACK STRUCTURE OF FUEL CELL AND METHOD OF ABSORBING THERMAL DEFORMATION IN FUEL CELL STACK

TECHNICAL FIELD

The present invention relates to a stack structure of a fuel cell and a method of absorbing thermal deformation in a fuel cell stack.

BACKGROUND ART

Conventionally, a fuel cell generates power by supplying gas to stacked members including a power generation cell formed by sandwiching an electrolyte between a fuel electrode and an oxidant electrode. In the fuel cell, the gas is sometimes supplied at high velocity or at high temperature depending on the situation. Accordingly, there is known a technique in which load applied to the stacked members is adjusted to protect the stacked members (for example, see Patent Literature 1).

CITATION LIST

Patent Literature

Patent Literature 1: Japanese Patent Application Publication No. 2013-20886

SUMMARY OF INVENTION

Technical Problem

In the configuration described in Patent Literature 1, no problem occurs during a steady operation of the fuel cell. However, for example, when the fuel cell is warmed up by supplying the gas thereto before the operation, there is a risk that load is applied to the stacked members and the stacked members deform. Specifically, in the configuration described in Patent Literature 1, there is a risk that gas leak or load loss occurs with deformation and the performance decreases due to the foregoing phenomenon.

An object of the present invention is to provide a stack structure of a fuel cell which can sufficiently reduce deformation occurring in stacked members.

Solution to Problem

A stack structure of a fuel cell according to the present invention for achieving the above object is a structure in which stacked bodies each formed by alternately stacking power generation cells and separators are fixed to an end plate by using fixing means, the power generation cells each formed by sandwiching an electrolyte between a fuel electrode and an oxidant electrode and configured to generate power by using supplied gas, the separators each having a flow passage portion, a gas flow-in port, and a gas flow-out port formed therein, the flow passage portion configured to supply the gas to the power generation cell, the gas flow-in port allowing the gas to flow into the flow passage portion, the gas flow-out port allowing the gas to flow out from the flow passage portion. The end plate includes an upper end plate and a lower end plate sandwiching the stacked bodies, the stacked bodies are arranged side by side and a first thermal deformation absorbing portion configured to absorb thermal deformation in a direction orthogonal to a stacking direction is formed between the stacked bodies, and the fixing means for fixing the stacked bodies to the end plate fix at least outer peripheral portions of the stacked bodies arranged side by side to the end plate.

A method of absorbing thermal deformation in a fuel cell stack according to the present invention for achieving the above object includes: forming a power generation cell by sandwiching an electrolyte between a fuel electrode and an oxidant electrode; forming a stacked body by sandwiching the power generation cell between a pair of separators; forming stacked body rows by stacking the stacked bodies; arranging the stacked body rows side by side while forming a space between the stacked body rows; fixing at least outer peripheral portions of the stacked bodies arranged side by side to the end plate for fixing the stacked bodies to the end plate by using the fixing means, the end plate including an upper end plate and a lower end plate sandwiching the stacked bodies; and absorbing thermal deformation in a direction orthogonal to a stacking direction by using the space between the stacked body rows.

DESCRIPTION OF EMBODIMENTS

Figure 1:
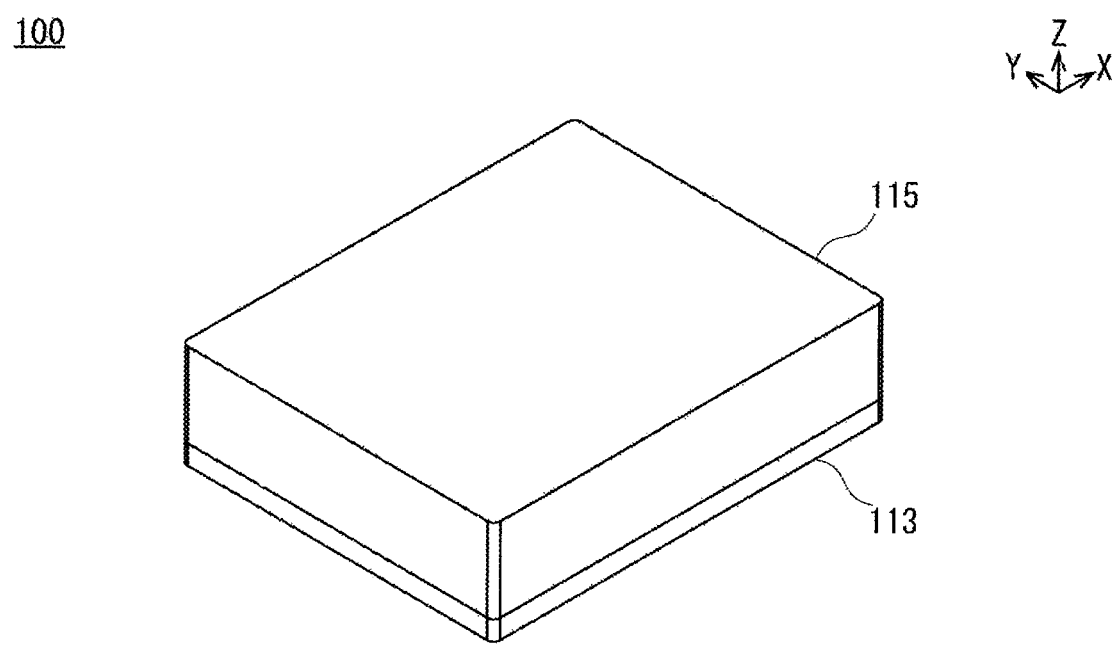
FIG. 1 is a perspective view illustrating a fuel cell of a first embodiment.

First to third embodiments of the present invention are described below with reference to the attached drawings. In the drawings, the same members are denoted by the same reference numerals and overlapping description is omitted. In the drawings, the sizes and the proportions of the members may be exaggerated to facilitate the understanding of the first to third embodiments and be different from the actual sizes and proportions.

Directions in the members forming the fuel cell are described by using arrows denoted by X, Y, and Z in the drawings. The direction of the arrow denoted by X indicates a short-side direction X of each stack 100S in the fuel cell 100. The direction of the arrow denoted by Y indicates a long-side direction Y of each stack 100S in the fuel cell 100. The direction of the arrow denoted by Z indicates a stacking direction Z of the fuel cell 100.

First Embodiment

Configuration of Fuel Cell 100

Figure 2:
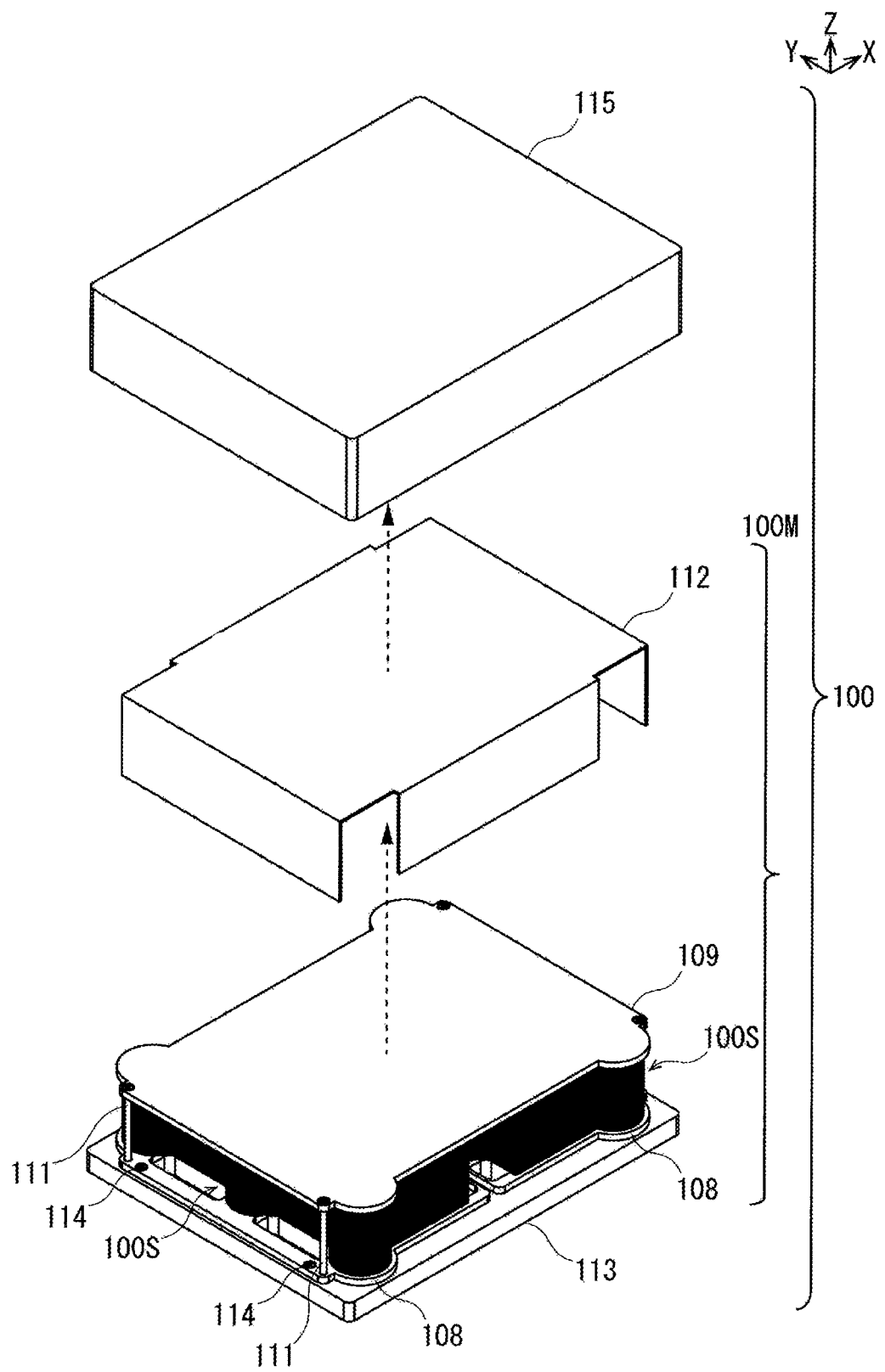
FIG. 2 is a perspective view illustrating the fuel cell of FIG. 1 in a partially disassembled state.
Figure 3:
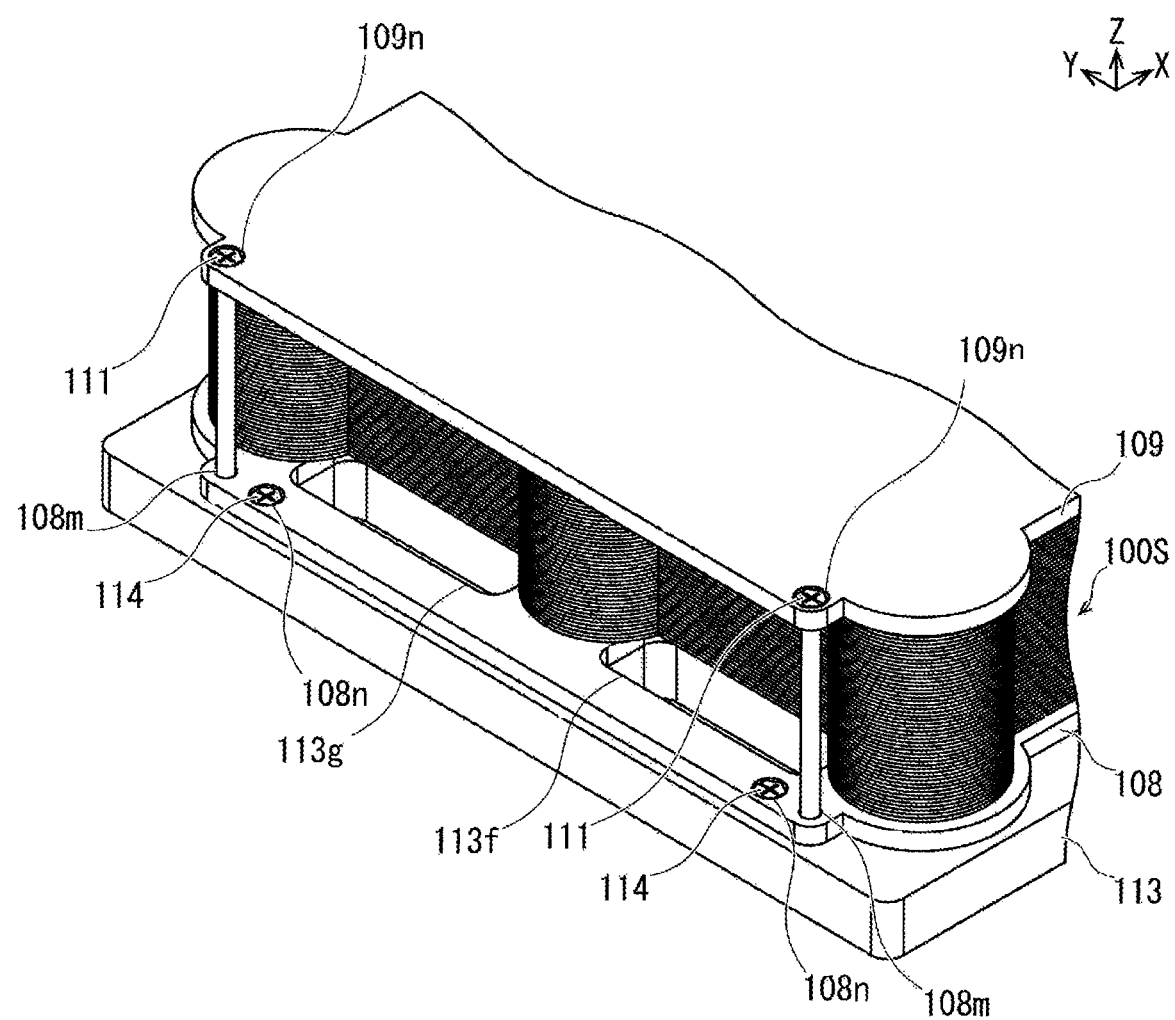
FIG. 3 is a perspective view illustrating part of the fuel cell of FIG. 2 in an enlarged manner.
Figure 4:
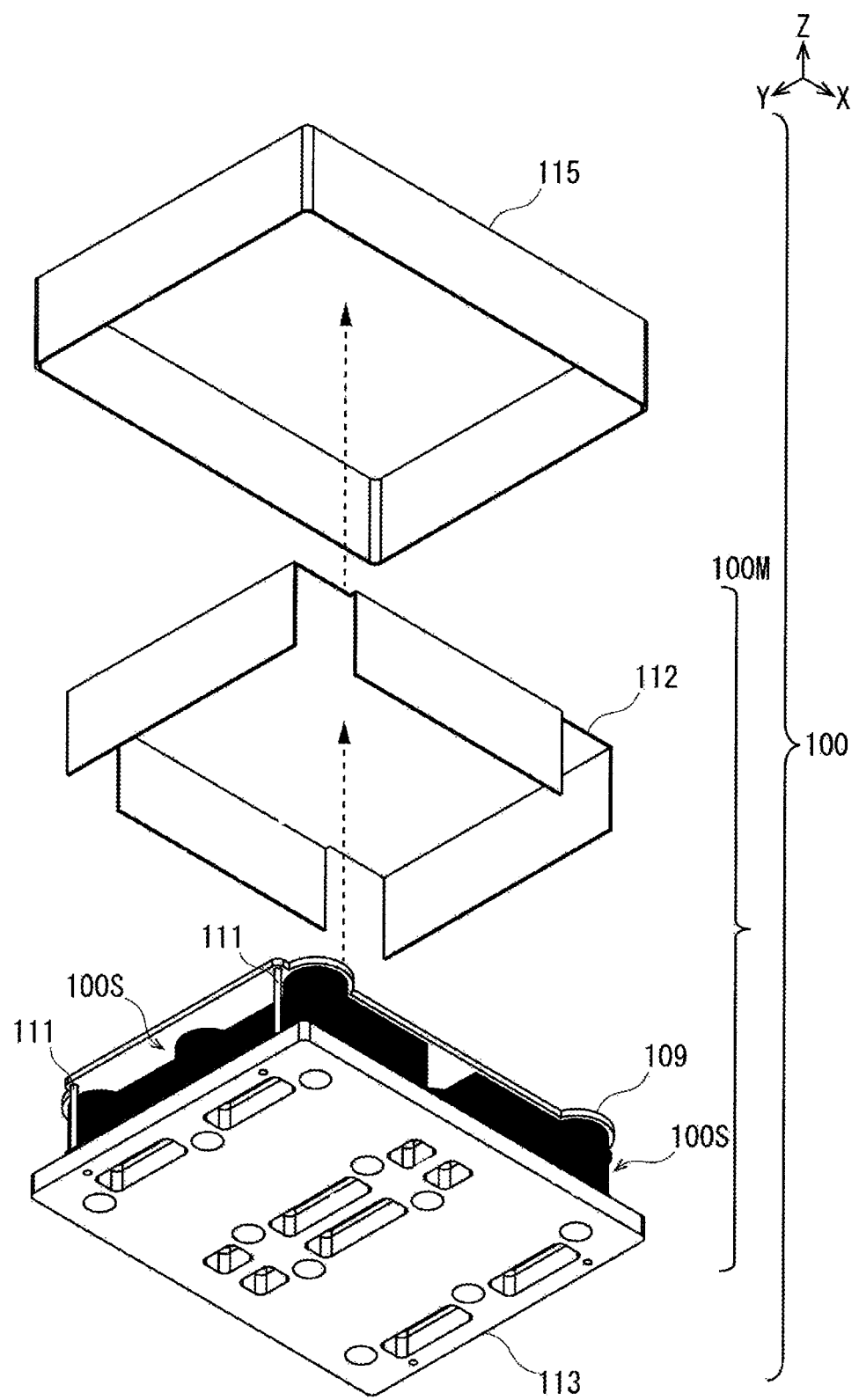
FIG. 4 is a perspective view illustrating the fuel cell of FIG. 2 as viewed from another direction (lower side).
Figure 5:
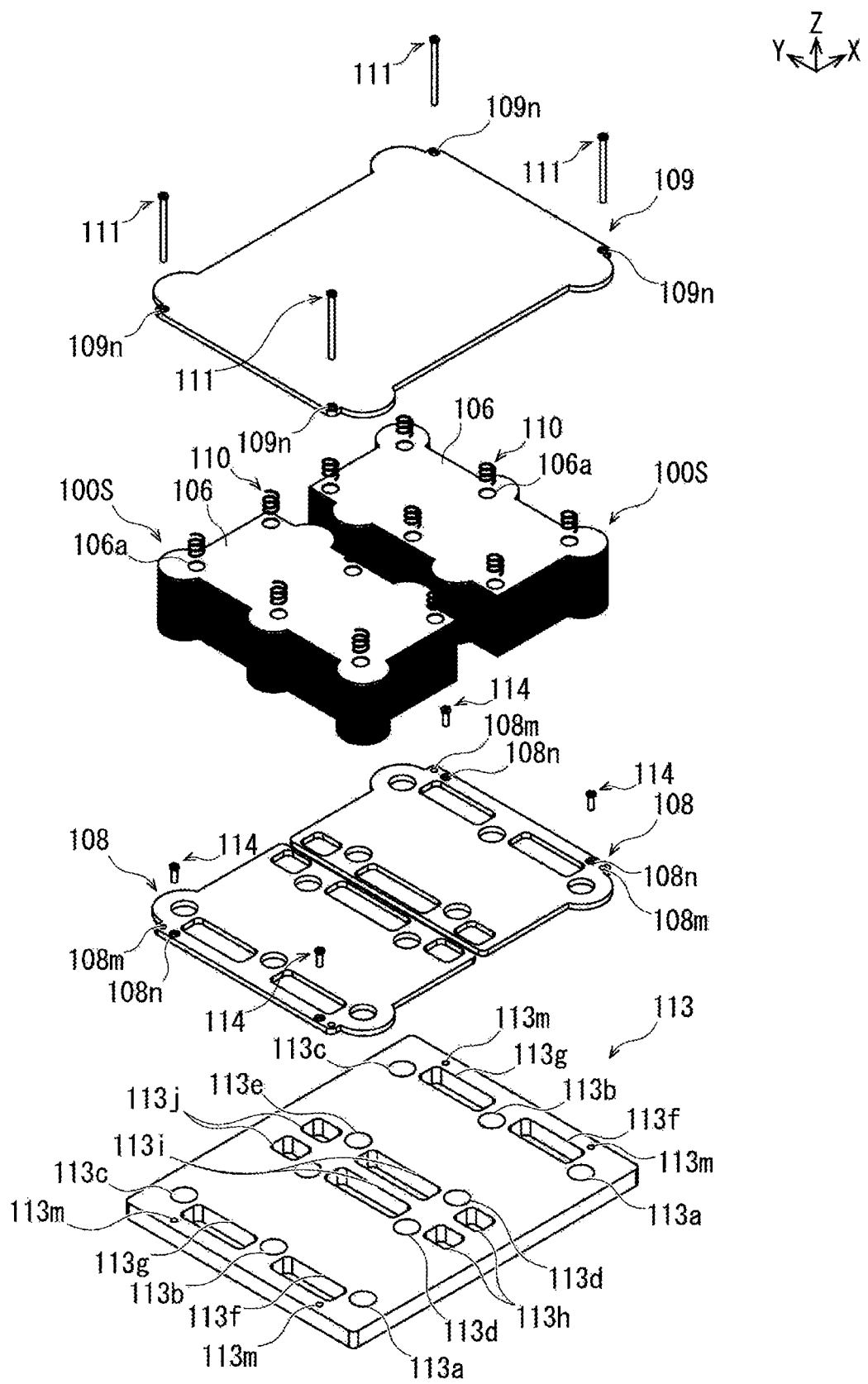
FIG. 5 is a perspective view illustrating a cell stack assembly and an external manifold of FIG. 2.
Figure 6:
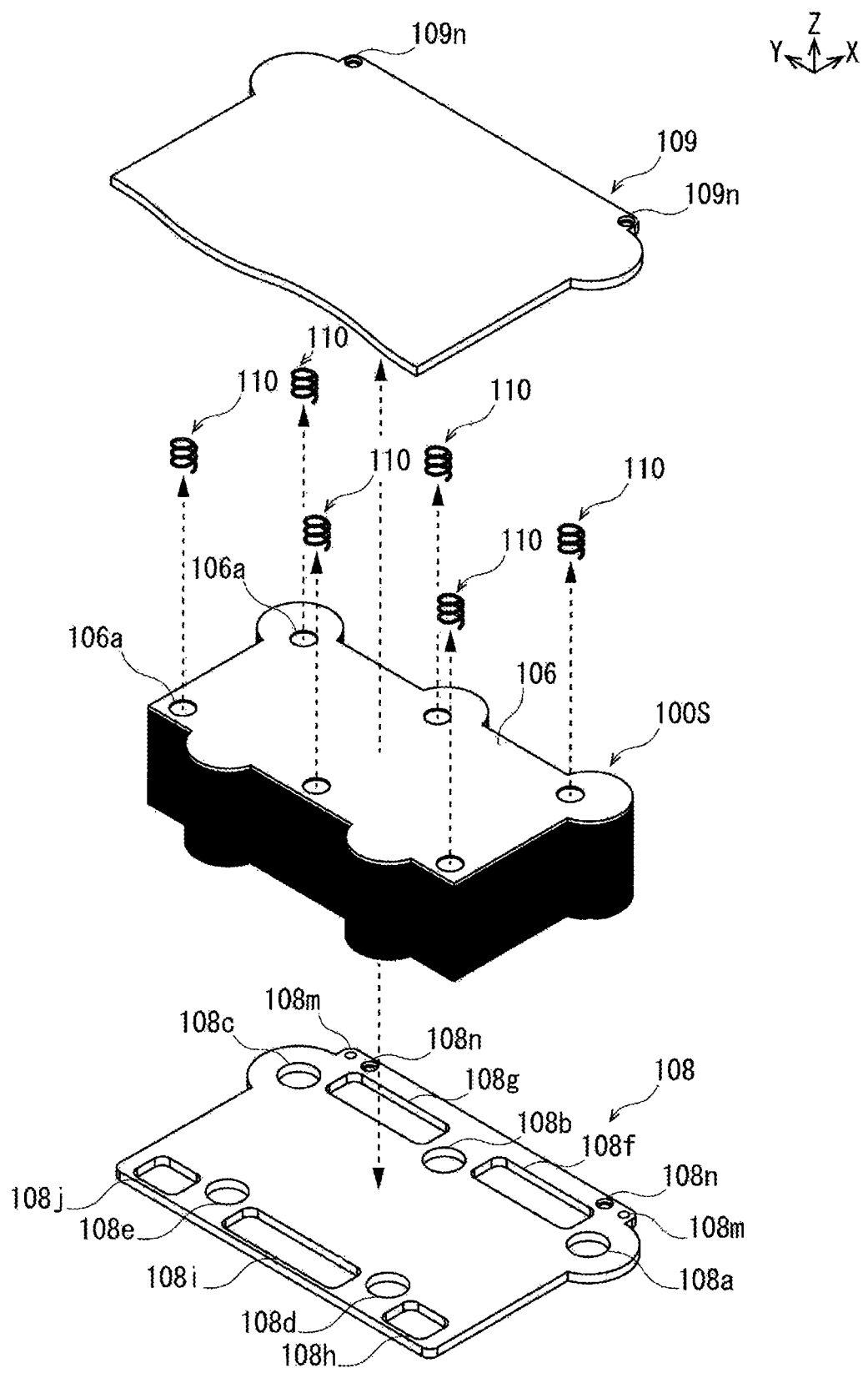
FIG. 6 is a perspective view illustrating an upper end plate (right half), a stack (right stack), and a lower end plate (right half) of FIG. 5.
Figure 7:
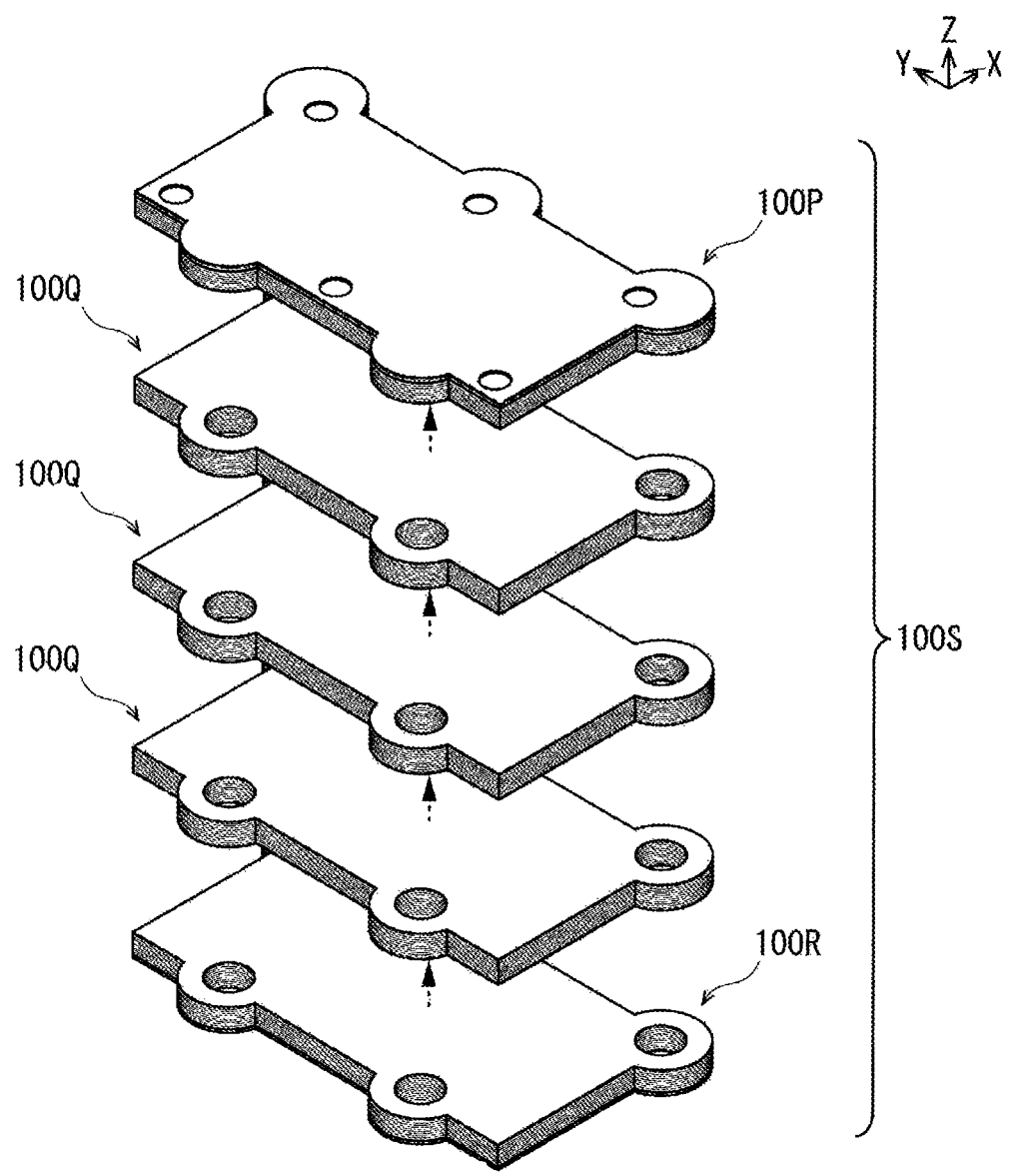
FIG. 7 is a perspective view illustrating a state where the stack of FIG. 2 is disassembled into an upper module unit, multiple middle module units, and a lower module unit.
Figure 8:
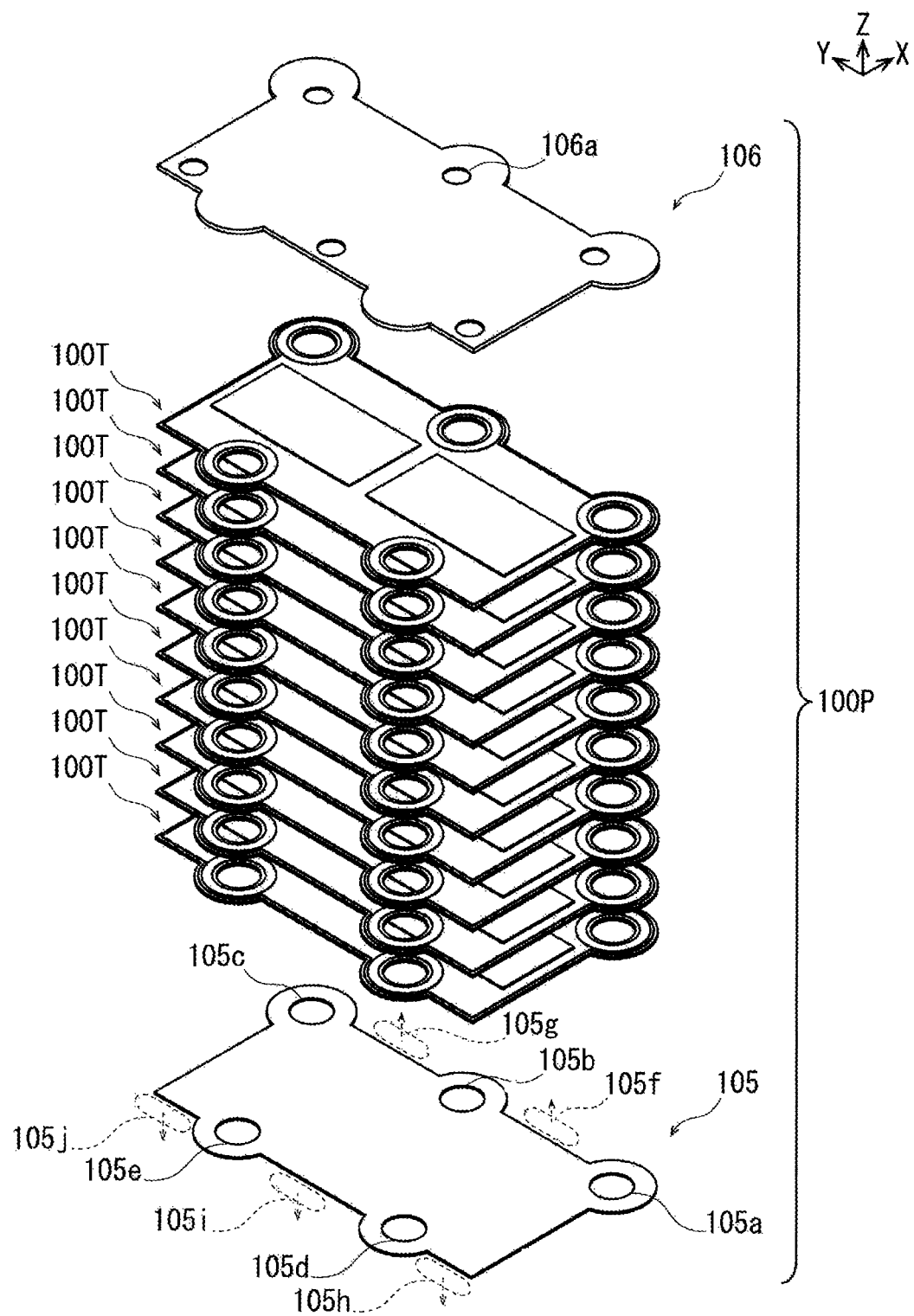
FIG. 8 is a perspective view illustrating the upper module unit of FIG. 7 in a disassembled state.
Figure 9:
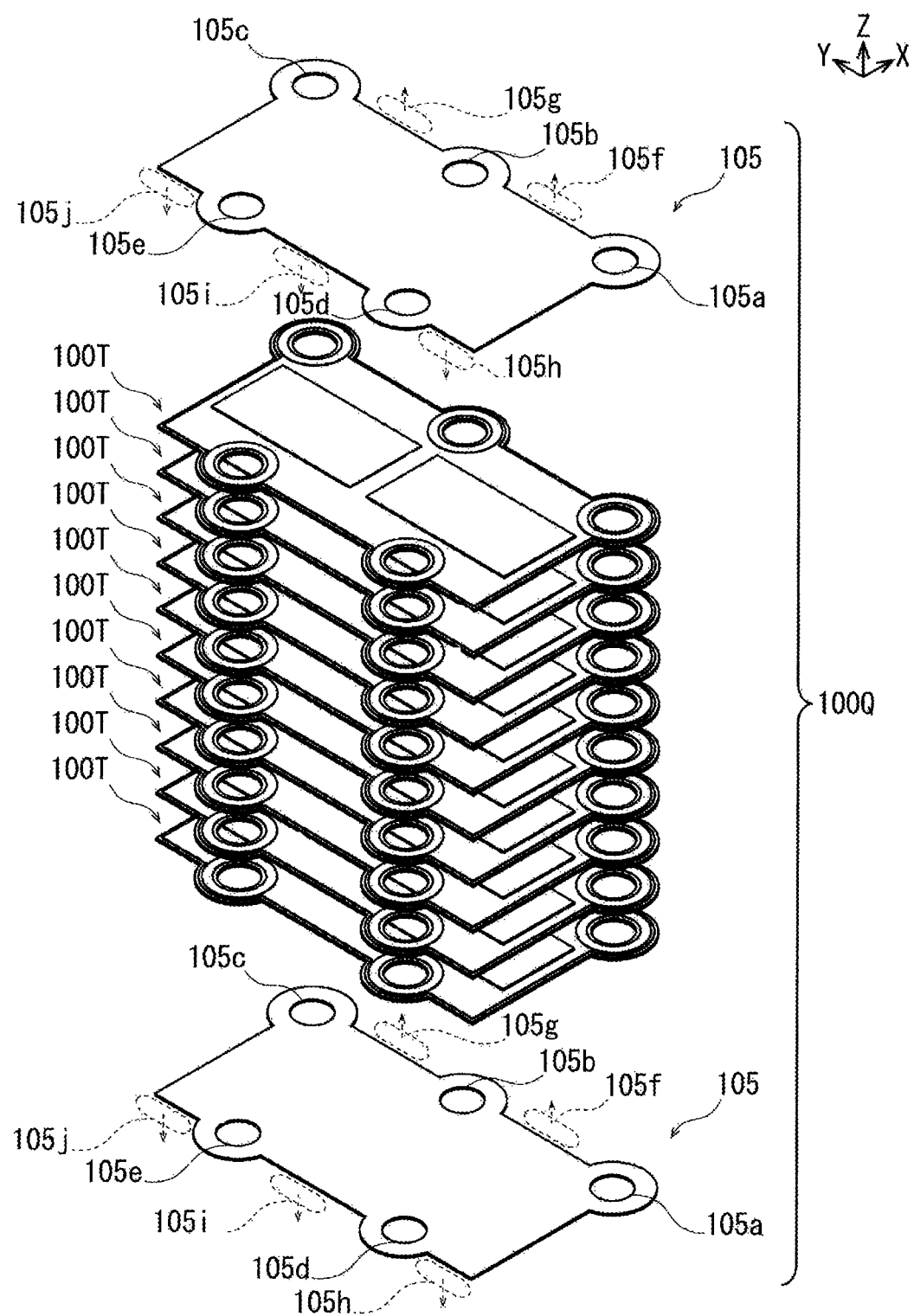
FIG. 9 is a perspective view illustrating one of the middle module units of FIG. 7 in a disassembled state.
Figure 10:
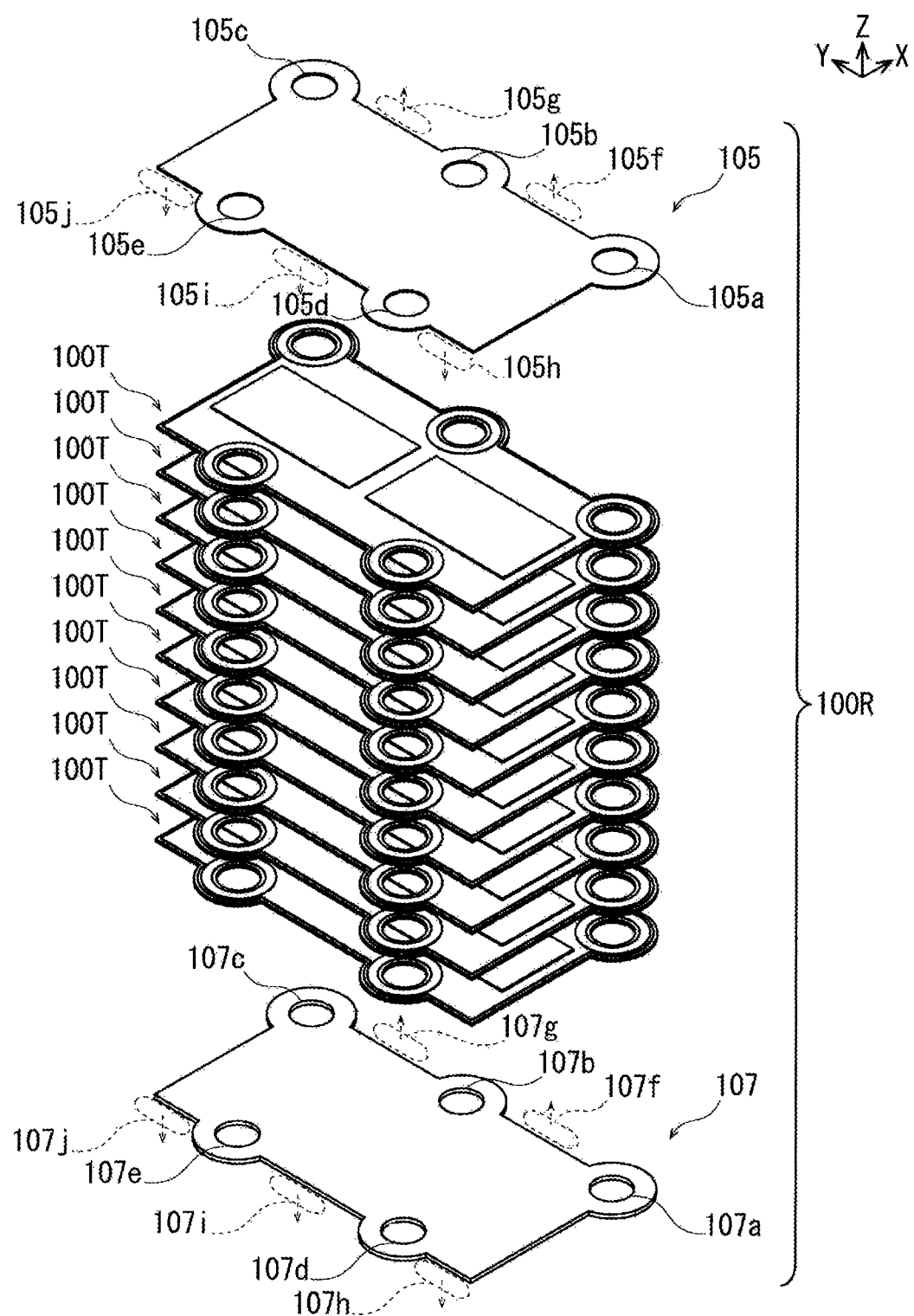
FIG. 10 is a perspective view illustrating the lower module unit of FIG. 7 in a disassembled state.
Figure 11:
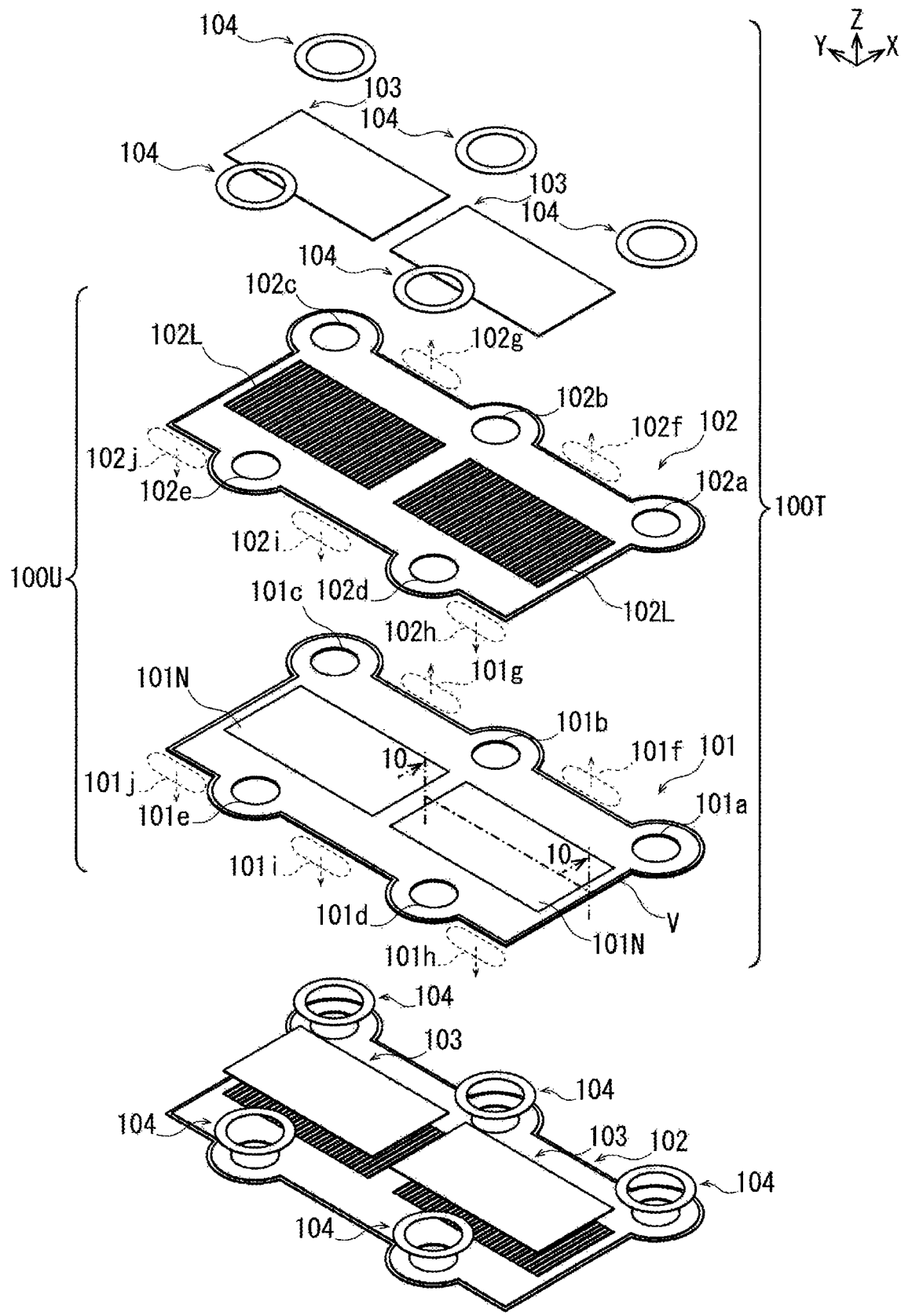
FIG. 11 is a perspective view illustrating one of cell units of FIGS. 8 to 10 and another cell unit (configurations excluding a metal-supported cell assembly) located below the one cell unit in a disassembled state.

FIG. 1 is a perspective view illustrating the fuel cell 100 of the first embodiment. FIG. 2 is a perspective view illustrating the fuel cell 100 of FIG. 1 in a partially disassembled state. FIG. 3 is a perspective view illustrating part of the fuel cell 100 of FIG. 2 in an enlarged manner. FIG. 4 is a perspective view illustrating the fuel cell 100 of FIG. 2 as viewed from another direction (lower side). FIG. 5 is a perspective view illustrating a cell stack assembly 100M and an external manifold 113 of FIG. 2. FIG. 6 is a perspective view illustrating an upper end plate 109 (right half), the stack 100S (right stack), and a lower end plate 108 (right half) of FIG. 5. FIG. 7 is a perspective view illustrating a state where the stack 100S of FIG. 2 is disassembled into an upper module unit 100P, multiple middle module units 100Q, and a lower module unit 100R. FIG. 8 is a perspective view illustrating the upper module unit 100P of FIG. 7 in a disassembled state. FIG. 9 is a perspective view illustrating one of the middle module units 100Q of FIG. 7 in a disassembled state. FIG. 10 is a perspective view illustrating the lower module unit 100R of FIG. 7 in a disassembled state. FIG. 11 is a perspective view illustrating one of cell units 100T of FIGS. 8 to 10 and another cell unit 100T (configurations excluding a metal-supported cell assembly 101) located below the one cell unit 100T in a disassembled state.

Figure 12:
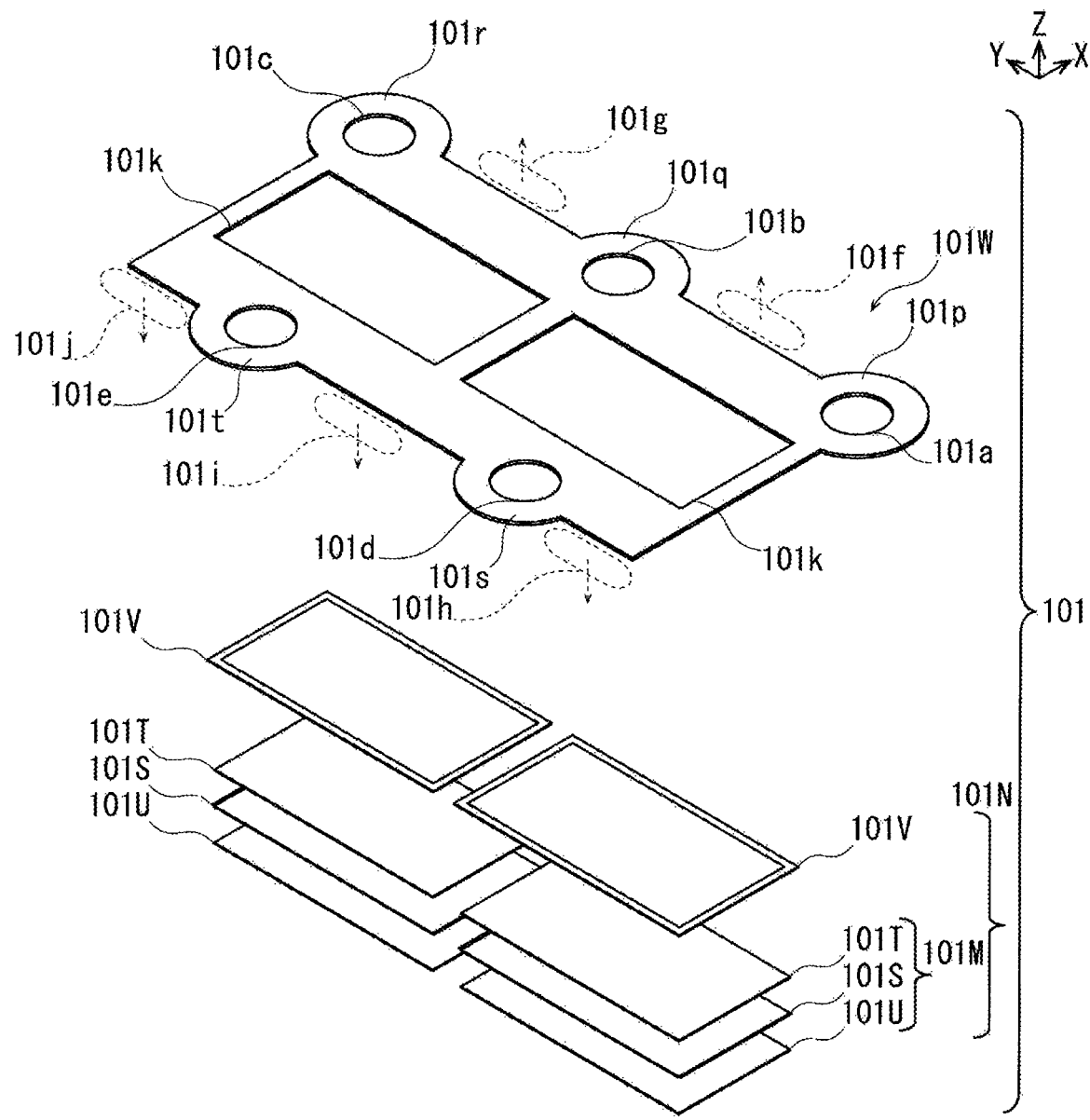
FIG. 12 is a perspective view illustrating the metal-supported cell assembly of FIG. 11 in a disassembled state.
Figure 13:
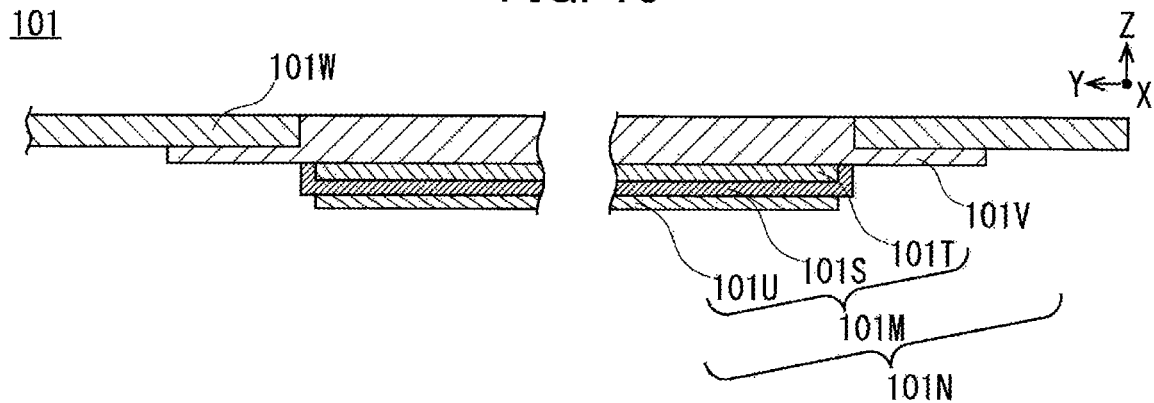
FIG. 13 is a side view illustrating a cross section of the metal-supported cell assembly of FIG. 11.
Figure 14:
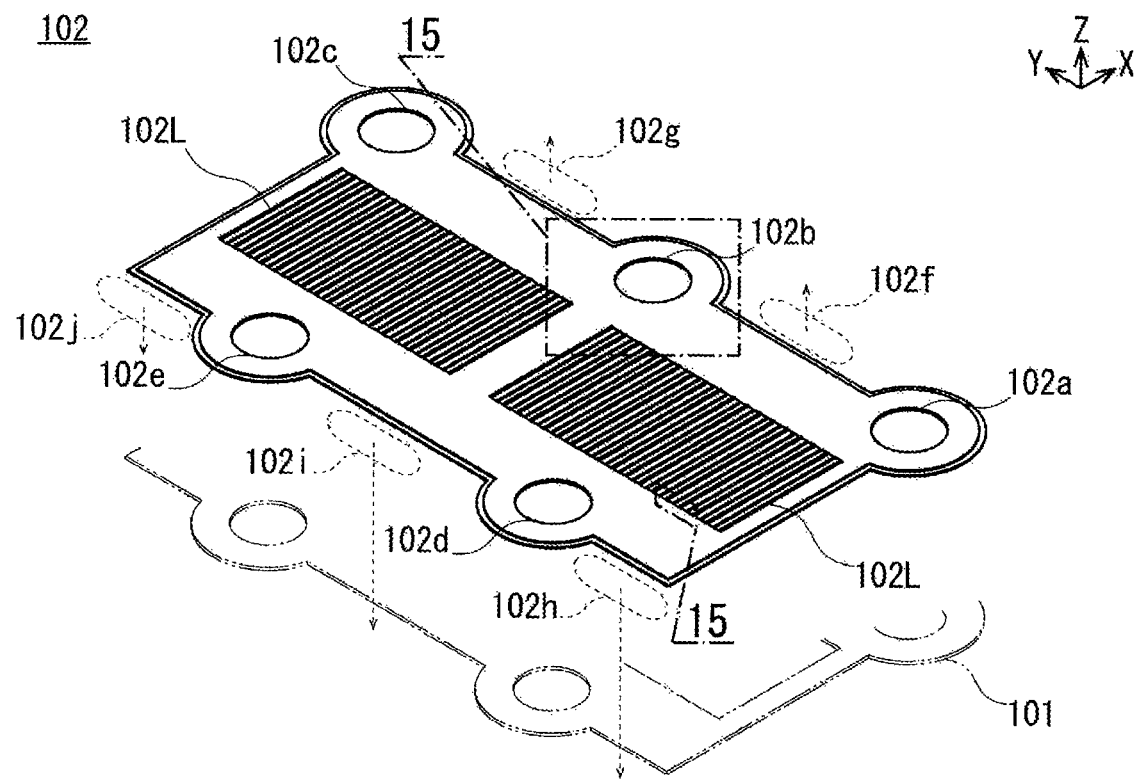
FIG. 14 is a perspective view illustrating a separator of FIG. 11 from the cathode side (illustrating the separator 102 as viewed from the upper side as in FIG. 11).
Figure 15:
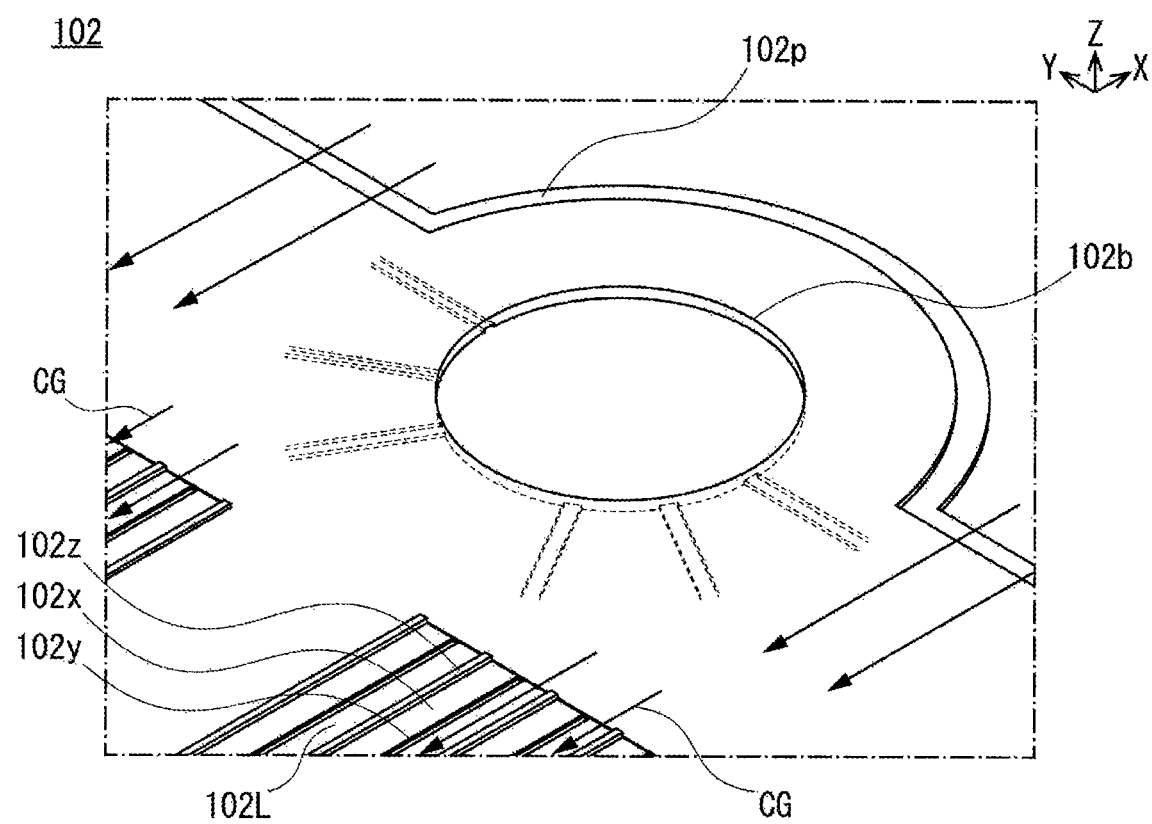
FIG. 15 is a perspective view illustrating a portion (region 15 in FIG. 14) of the separator of FIG. 14.
Figure 16:
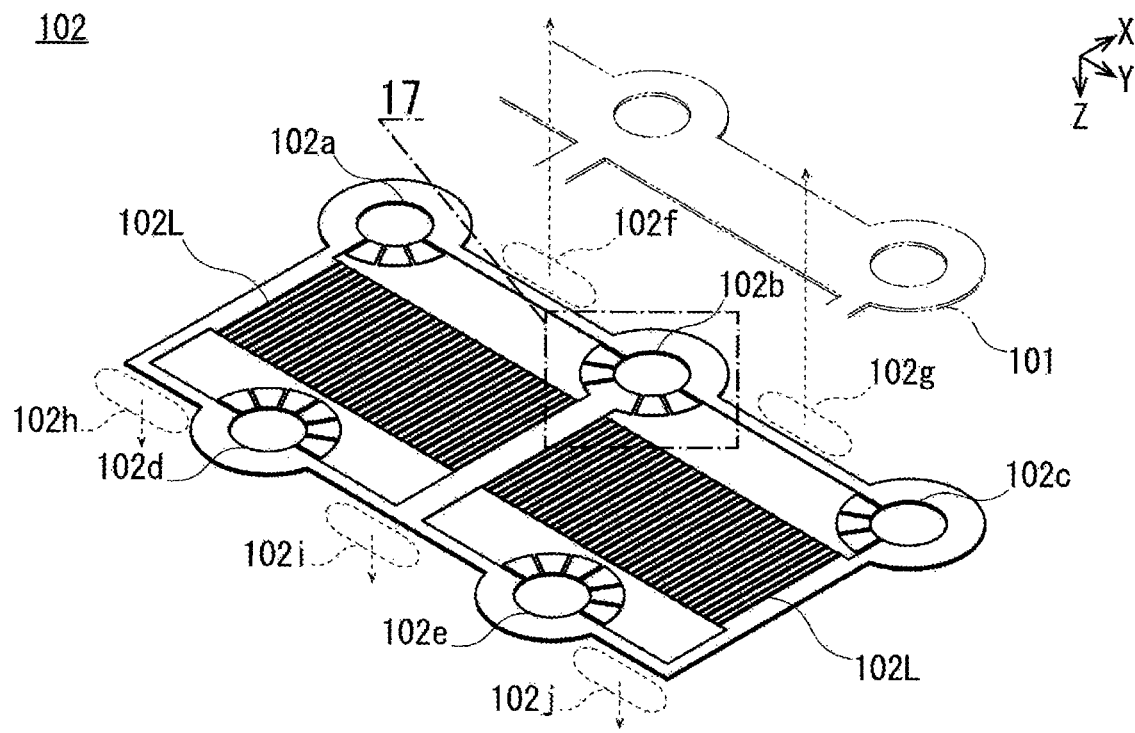
FIG. 16 is a perspective view illustrating the separator of FIG. 11 from the anode side (illustrating the separator 102 as viewed from the lower side as different from FIG. 11).
Figure 17:
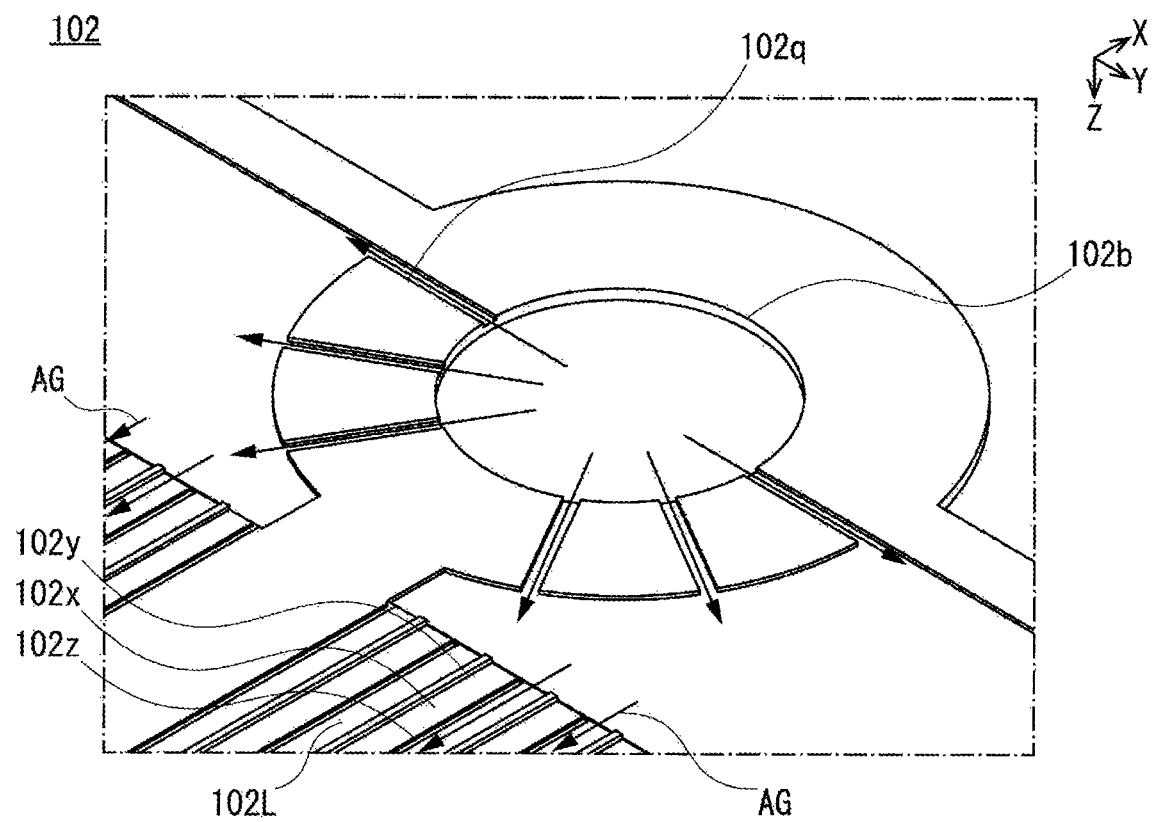
FIG. 17 is a perspective view illustrating a portion (region 17 in FIG. 16) of the separator of FIG. 16.
Figure 18:
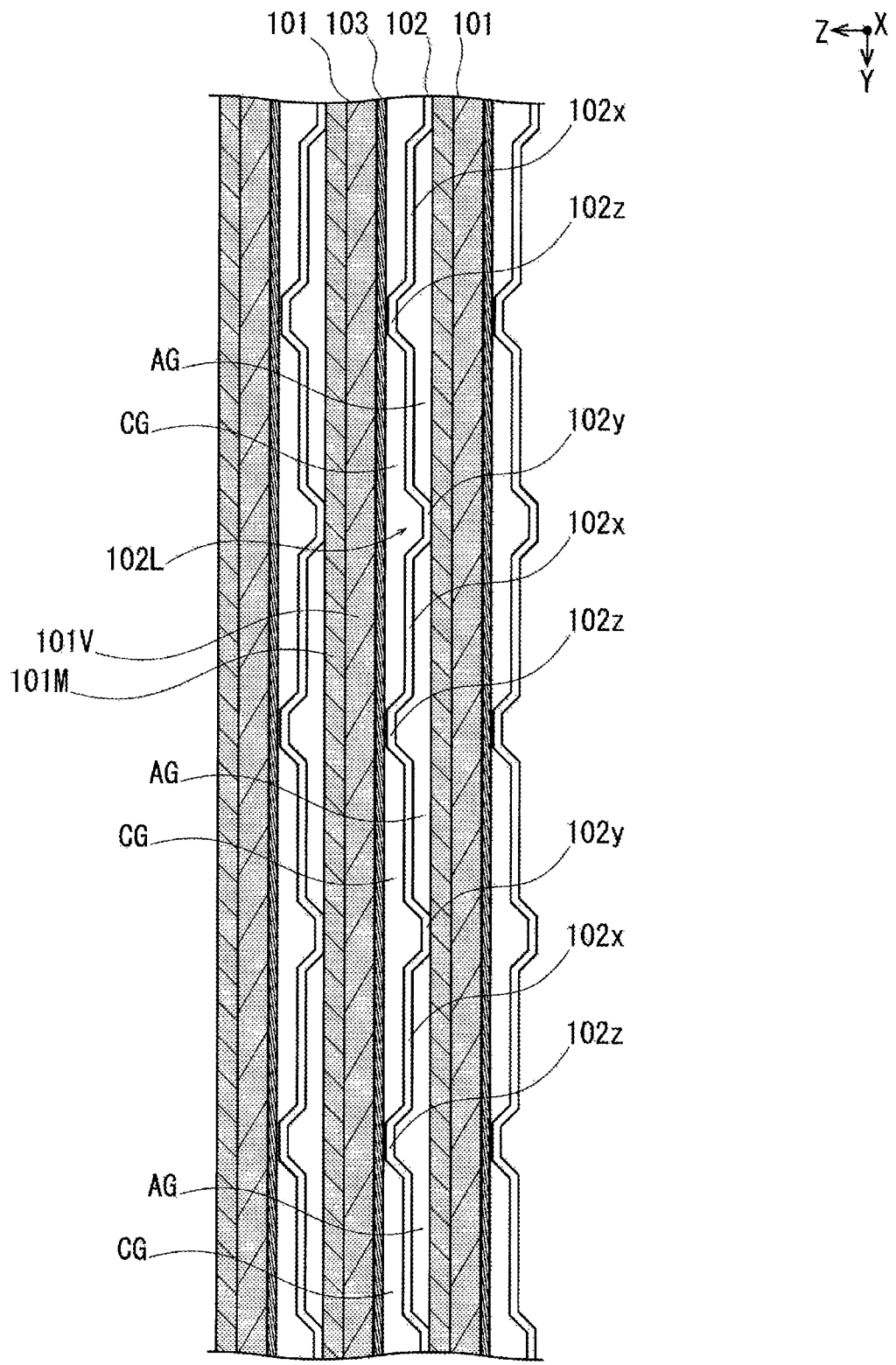
FIG. 18 is a cross-sectional view partially illustrating a state where the metal-supported cell assemblies, the separators, and current collection assisting layers of FIG. 11 are stacked.

FIG. 12 is a perspective view illustrating the metal-supported cell assembly 101 of FIG. 11 in a disassembled state. FIG. 13 is a side view illustrating a cross section of the metal-supported cell assembly 101 of FIG. 11. FIG. 14 is a perspective view illustrating a separator 102 of FIG. 11 from the cathode side (illustrating the separator 102 as viewed from the upper side as in FIG. 11). FIG. 15 is a perspective view illustrating a portion (region 15 in FIG. 14) of the separator 102 of FIG. 14. FIG. 16 is a perspective view illustrating the separator 102 of FIG. 11 from the anode side (illustrating the separator 102 as viewed from the lower side as different from FIG. 11). FIG. 17 is a perspective view illustrating a portion (region 17 in FIG. 16) of the separator 102 of FIG. 16. FIG. 18 is a cross-sectional view partially illustrating a state where the metal-supported cell assemblies 101, the separators 102, and current collection assisting layers 103 of FIG. 11 are stacked.

As illustrated in FIGS. 1 and 2, the fuel cell 100 is formed by sandwiching the cell stack assembly 100M between the external manifold 113 configured to supply gas from the outside and a cover 115 configured to protect the cell stack assembly 100M from the upper and lower sides.

As illustrated in FIGS. 2 to 4, the cell stack assembly 100M is formed by sandwiching a pair of stacks 100S between one upper end plate 109 and a pair of the lower end plates 108 from the upper and lower sides and covering the stacks 100S with an air shelter 112 configured to seal a cathode gas CG. As illustrated in FIGS. 2 to 7 (particularly FIG. 7), each stack 100S is formed by stacking the upper module unit 100P, the multiple middle module units 100Q, and the lower module unit 100R.

In the fuel cell 100, as illustrated in FIG. 8, the upper module unit 100P is formed by sandwiching the multiple cell units 100T stacked one on top of another between an upper current collection plate 106 configured to output power generated in the cell units 100T to the outside and a module end 105 corresponding to an end plate from the upper and lower sides. As illustrated in FIG. 9, each middle module unit 100Q is formed by sandwiching the multiple cell units 100T stacked one on top of another between the paired module ends 105 from the upper and lower sides. As illustrated in FIG. 10, the lower module unit 100R is formed by sandwiching the multiple cell units 100T stacked one on top of another between the module end 105 and a lower current collection plate 107 from the upper and lower sides.

In the unit structure of the fuel cell 100, as illustrated in FIG. 11, each cell unit 100T includes the metal-supported cell assembly 101 which is provided with power generation cells 101M configured to generate power by using supplied gas, the separator 102 which isolates the power generation cells 101M of the metal-supported cell assemblies 101 adjacent in the stacking direction Z from one another, the current collection assisting layers 103 which make surface pressure even while forming a space allowing gas to flow between the separator 102 and the power generation cells 101M of the metal-supported cell assembly 101, and sealing members 104 which seal edges of manifold portions of the metal-supported cell assembly 101 and the separator 102 and limit a flow of gas. The current collection assisting layers 103 and the sealing members 104 are arranged between the metal-supported cell assembly 101 and the separator 102 adjacent to each other in the stacking direction Z due to their structures.

In this case, in a manufacturing method of the fuel cell 100, as illustrated in a center portion of FIG. 11, outer edges of the metal-supported cell assembly 101 and the separator 102 are annularly joined along a joining line V and a joined body 100U is formed. Accordingly, the current collection assisting layers 103 and the sealing members 104 are configured to be arranged between the joined bodies 100U (the metal-supported cell assembly 101 and the separator 102) adjacent to each other in the stacking direction Z. Specifically, as illustrated in a lower portion of FIG. 11, the current collection assisting layers 103 and the sealing members 104 are arranged between the metal-supported cell assembly 101 of one joined body 100U and the separator 102 of another joined body 100U adjacent to the one joined body 100U in the stacking direction Z.

Configurations of the fuel cell 100 are described below.

As illustrated in FIGS. 12 and 13, the metal-supported cell assembly 101 is provided with the power generation cells 101M configured to generate power by using the supplied gas.

As illustrated in FIGS. 12 and 13, the metal-supported cell assembly 101 is formed of two metal-supported cells 101N arranged side by side in the long-side direction Y and a cell frame 101W holding peripheries of the metal-supported cells 101N.

Each metal-supported cell 101N is formed of the power generation cell 101M and a support metal 101V supporting the power generation cell 101M from one side. In the metal-supported cell assembly 101, as illustrated in FIGS. 12 and 13, each power generation cell 101M is formed by sandwiching an electrolyte 101S between an anode 101T and a cathode 101U.

As illustrated in FIGS. 12 and 13, the anode 101T is a fuel electrode and causes an anode gas AG (for example, hydrogen) to react with oxide ions to generate oxide of the anode gas AG and take out electrons. The anode 101T is resistant to a reducing atmosphere, allows the anode gas AG to pass through, has high electrical conductivity, and has a catalyst effect of causing the anode gas AG to react with oxide ions. The anode 101T is formed in a rectangular shape smaller than the electrolyte 101S. For example, the anode 101T is made of cemented carbide in which metal such as nickel and oxide ion conductor such as yttria-stabilized zirconia are mixed. As illustrated in FIGS. 12 and 13, the anode 101T has a rectangular thin plate shape.

As illustrated in FIGS. 12 and 13, the electrolyte 101S allows oxide ions to pass through from the cathode 101U to the anode 101T. The electrolyte 101S allows oxide ions to pass through but does not allow gas and electrons to pass through. The electrolyte 101S is formed in a rectangular shape. For example, the electrolyte 101S is made of solid oxide ceramic such as stabilized zirconia containing yttrium, neodymium oxide, samarium, gadolinium, scandium, or the like in a solid solution state. As illustrated in FIGS. 12 and 13, the electrolyte 101S has a rectangular thin plate shape slightly larger than the anode 101T. As illustrated in FIG. 13, an outer edge of the electrolyte 101S is bent toward the anode 101T and is in contact with a side surface of the anode 101T extending in the stacking direction Z. An end of the outer edge of the electrolyte 101S is in contact with the support metal 101V.

As illustrated in FIGS. 12 and 13, the cathode 101U is an oxidant electrode and causes the cathode gas CG (for example, oxygen included in air) to react with electrons to convert oxygen molecules into oxide ions. The cathode 101U is resistant to an oxidizing atmosphere, allows the cathode gas CG to pass through, has high electrical conductivity, and has a catalyst effect of converting oxygen molecules into oxide ions. The cathode 101U is formed in a rectangular shape smaller than the electrolyte 101S. For example, the cathode 101U is made of an oxide of lanthanum, strontium, manganese, cobalt, or the like. As illustrated in FIGS. 12 and 13, like the anode 101T, the cathode 101U has a rectangular thin plate shape. The cathode 101U faces the anode 101T with the electrolyte 101S therebetween. Since the outer edge of the electrolyte 101S is bent toward the anode 101T, an outer edge of the cathode 101U does not come into contact with an outer edge of the anode 101T.

As illustrated in FIGS. 12 and 13, the support metal 101V supports the power generation cell 101M from the anode 101T side. The support metal 101V has gas permeability, high electrical conductivity, and sufficient strength. The support metal 101V is formed in a rectangular shape sufficiently larger than the anode 101T. For example, the support metal 101V is made of stainless steel or corrosion resistant alloy or corrosion resistant steel containing nickel and chrome.

As illustrated in FIGS. 12 and 13, the cell frame 101W holds the peripheries of the metal-supported cells 101N. The cell frame 101W is formed in a thin rectangular shape. The cell frame 101W is provided with paired opening portions 101k arranged in the long-side direction Y. Each of the paired opening portions 101k of the cell frame 101W is a rectangular penetrating hole and is smaller than an outer shape of the support metal 101V. The cell frame 101W is made of metal and is insulated by using an insulator or coating. The insulator is formed by, for example, attaching aluminum oxide to the cell frame 101W. The metal-supported cell 101N is joined to the cell frame 101W by joining outer edges of the support metals 101V to inner edges of the opening portions 101k of the cell frame 101W.

As illustrated in FIGS. 12 and 13, the cell frame 101W is provided with circular extending portions (a first extending portion 101p, a second extending portion 101q, and a third extending portion 101r) extending in a surface direction, respectively, from a right end, a center portion, and a left end of one side extending in the long-side direction Y. The cell frame 101W is provided with circular extending portions (a fourth extending portion 101s and a fifth extending portion 101t) extending in the surface direction, respectively, from two portions of another side extending in the long-side direction Y which are away from the center of the other side. In the cell frame 101W, the first, second, and third extending portions 101p, 101q, and 101r and the fourth and fifth extending portions 101s and 101t are arranged alternately in the longitudinal direction Y across the paired opening portions 101k.

As illustrated in FIG. 12, the cell frame 101W is provided with an anode side first flow-in port 101a, an anode side second flow-in port 101b, and an anode side third flow-in port 101c for passing (flow-in) of the anode gas AG respectively in the first extending portion 101p, the second extending portion 101q, and the third extending portion 101r. The cell frame 101W is provided with an anode side first flow-out port 101d and an anode side second flow-out port 101e for passing (flow-out) of the anode gas AG respectively in the fourth extending portion 101s and the fifth extending portion 101t. The anode side first flow-in port 101a, the anode side second flow-in port 101b, the anode side third flow-in port 101c, the anode side first flow-out port 101d, and the anode side second flow-out port 101e of the anode gas AG are so-called manifold.

As illustrated in FIG. 12, the cell frame 101W is provided with a cathode side first flow-in port 101f for passing (flow-in) of the cathode gas CG in a space between the first extending portion 101p and the second extending portion 101q. The cell frame 101W is provided with a cathode side second flow-in port 101g for passing (flow-in) of the cathode gas CG in a space between the second extending portion 101q and the third extending portion 101r. The cell frame 101W is provided with a cathode side first flow-out port 101h for passing (flow-out) of the cathode gas CG on the right side of the fourth extending portion 101s in FIG. 12. The cell frame 101W is provided with a cathode side second flow-out port 101i for passing (flow-out) of the cathode gas CG in a space between the fourth extending portion 101s and the fifth extending portion 101t. The cell frame 101W is provided with a cathode side third flow-out port 101j for passing (flow-out) of the cathode gas CG on the left side of the fifth extending portion 101t in FIG. 12. In the cell frame 101W, the cathode side first flow-in port 101f, the cathode side second flow-in port 101g, the cathode side first flow-out port 101h, the cathode side second flow-out port 101i, and the cathode side third flow-out port 101j correspond to spaces between an outer peripheral surface of the cell frame 101W and an inner surface of the air shelter 112.

As illustrated in FIGS. 11 and 14-18, the separator 102 is provided between the power generation cells 101M of the stacked metal-supported cell assemblies 101 and isolates the adjacent power generation cells 101M from one another.

The separator 102 is arranged to face the metal-supported cell assembly 101. The separator 102 has the same outer shape as the metal-supported cell assembly 101. The separator 102 is made of metal and is insulated by using an insulator or coating except for regions facing the power generation cells 101M (flow passage portions 102L). The insulator is formed by, for example, attaching aluminum oxide to the separator 102. In the separator 102, the flow passage portions 102L are provided side by side in the long-side direction Y to face the power generation cells 101M.

In the separator 102, as illustrated in FIGS. 11 and 14-18, each flow passage portion 102L is formed by arranging flow passages, extending in a direction (short-side direction X) of gas flow, side by side in a direction (long-side direction Y) orthogonal to the direction (short-side direction X) of gas flow. As illustrated in FIGS. 15, 17, and 18, in each flow passage portion 102L, protrusion-shaped anode side projections 102y are provided at fixed intervals to protrude downward from a flat portion 102x being flat in a plane extending in the long-side direction Y and the short-side direction X. The anode side projections 102y extend in the direction (short-side direction X) of gas flow. The anode side projections 102y protrude downward from a lower end of the separator 102. As illustrated in FIGS. 15, 17, and 18, in each flow passage portion 102L, protrusion-shaped cathode side projections 102z are provided at fixed intervals to protrude upward from the flat portion 102x. The cathode side projections 102z extend in the direction (short-side direction X) of gas flow. The cathode side projections 102z protrude upward from an upper end of the separator 102. In each flow passage portion 102L, the anode side projections 102y and the protrusion-shape cathode side projections 102z are provided alternately in the long-side direction Y with the flat portion 102x therebetween.

In the separator 102, as illustrated in FIGS. 17 and 18, gaps between the flow passage portions 102L and the metal-supported cell assembly 101 located below (right side in FIG. 18) the flow passage portions 102L are formed as flow passages of the anode gas AG. The anode gas AG flows from an anode side second flow-in port 102b and the like of the separator 102 illustrated in FIG. 16 into the flow passage portions 102L on the anode side through multiple grooves 102q illustrated in FIGS. 16 and 17. In the separator 102, as illustrated in FIGS. 16 and 17, the multiple grooves 102q are formed to radially extend from an anode side first flow-in port 102a, the anode side second flow-in port 102b, and an anode side third flow-in port 102c toward the flow passage portions 102L on the anode side. In the separator 102, as illustrated in FIGS. 15 and 18, gaps between the flow passage portions 102L and the metal-supported cell assembly 101 located above (left side in FIG. 18) the flow passage portions 102L are formed as flow passages of the cathode gas CG. The cathode gas CG flows from a cathode side first flow-in port 102f and a cathode side second flow-in port 102g of the separator 102 illustrated in FIG. 14 into the flow passage portions 102L on the cathode side by crossing an outer edge 102p of the separator 102 on the cathode side illustrated in FIGS. 14 and 15. In the separator 102, as illustrated in FIG. 15, the outer edge 102p on the cathode side is formed to be thinner than other portions.

As illustrated in FIGS. 11, 14, and 16, in the separator 102, the anode side first flow-in port 102a, the anode side second flow-in port 102b, the anode side third flow-in port 102c, an anode side first flow-out port 102d, and an anode side second flow-out port 102e for passing of the anode gas AG are provided to be aligned relative to the metal-supported cell assembly 101 in the stacking direction Z. In the separator 102, the cathode side first flow-in port 102f, the cathode side second flow-in port 102g, a cathode side first flow-out port 102h, a cathode side second flow-out port 102i, and a cathode side third flow-out port 102j for passing of the cathode gas CG are provided to be aligned relative to the metal-supported cell assembly 101 in the stacking direction Z. In the separator 102, the cathode side first flow-in port 102f, the cathode side second flow-in port 102g, the cathode side first flow-out port 102h, the cathode side second flow-out port 102i, and the cathode side third flow-out port 102j of the cathode gas CG correspond to spaces between an outer peripheral surface of the separator 102 and the inner surface of the air shelter 112.

As illustrated in FIG. 11, each current collection assisting layer 103 makes the surface pressure even while forming a space allowing the gas to flow between the power generation cell 101M and the separator 102 and assists an electrical contact between the power generation cell 101M and the separator 102.

The current collection assisting layer 103 is so-called expanded metal. The current collection assisting layer 103 is arranged between the power generation cell 101M and the flow passage portion 102L of the separator 102. The current collection assisting layer 103 has the same outer shape as the power generation cell 101M. The current collection assisting layer 103 has a metal mesh shape provided with openings of a rhombic shape or the like arranged in a lattice pattern.

As illustrated in FIG. 11, the sealing members 104 partially seal the gap between the metal-supported cell assembly 101 and the separator 102 and limit the flow of gas.

The sealing members 104 have functions of a spacer and a seal and are so-called gaskets. The sealing members 104 prevent the anode gas AG from flowing from the anode side flow-in ports (for example, the anode side first flow-in port 102a) and the anode side flow-out ports (for example, the anode side first flow-out port 102d) of the separator 102 toward the flow passages of the separator 102 on the cathode side and mixing into the flow passages. The sealing members 104 are formed in a ring shape. The sealing members 104 are joined to inner peripheral edges of the anode side flow-in ports (for example, the anode side first flow-in port 102a) and the anode side flow-out port (for example, the anode side first flow-out port 102d) leading to the surface of the separator 102 on the cathode side. For example, the sealing members 104 are made of Thermiculite with heat resistance and sealing properties.

As illustrated in FIGS. 8 to 10, each module end 105 is a plate which holds a lower end or an upper end of the multiple cell units 100T stacked one on top of another.

The module end 105 is arranged at the lower end or the upper end of the multiple cell units 100T stacked one on top of another. The module end 105 has the same outer shape as the cell units 100T. The module end 105 is made of an electrically-conductive material which does not allow gas to pass through and is insulated by using an insulator or coating except for regions facing the power generation cells 101M and the other module end 105. The insulator is formed by, for example, attaching aluminum oxide to the module end 105.

In the module end 105, an anode side first flow-in port 105a, an anode side second flow-in port 105b, an anode side third flow-in port 105c, an anode side first flow-out port 105d, and an anode side second flow-out port 105e for passing of the anode gas AG are provided to be aligned relative to the cell units 100T in the stacking direction Z. In the module end 105, a cathode side first flow-in port 105f, a cathode side second flow-in port 105g, a cathode side first flow-out port 105h, a cathode side second flow-out port 105i, and a cathode side third flow-out port 105j for passing of the cathode gas CG are provided to be aligned relative to the cell units 100T in the stacking direction Z. In the module end 105, the cathode side first flow-in port 105f, the cathode side second flow-in port 105g, the cathode side first flow-out port 105h, the cathode side second flow-out port 105i, and the cathode side third flow-out port 105j corresponds to spaces between an outer peripheral surface of the module end 105 and the inner surface of the air shelter 112.

As illustrated in FIG. 8, the upper current collection plate 106 outputs power generated in the cell units 100T to the outside.

As illustrated in FIG. 8, the upper current collection plate 106 is arranged at an upper end of the upper module unit 100P. The upper current collection plate 106 has the same outer shape as the cell units 100T. The upper current collection plate 106 is provided with a terminal (not illustrated) to be connected to an external current carrying member. The upper current collection plate 106 is provided with multiple cylindrical recess portions 106a for arranging springs 110 on an upper surface. The upper current collection plate 106 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the upper current collection plate 106.

As illustrated in FIG. 10, the lower current collection plate 107 outputs power generated in the cell units 100T to the outside.

As illustrated in FIG. 10, the lower current collection plate 107 is arranged at a lower end of the lower module unit 100R. The lower current collection plate 107 has the same outer shape as the upper current collection plate 106. The lower current collection plate 107 is provided with a terminal (not illustrated) to be connected to an external current carrying member. The lower current collection plate 107 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the lower current collection plate 107.

In the lower current collection plate 107, an anode side first flow-in port 107a, an anode side second flow-in port 107b, an anode side third flow-in port 107c, an anode side first flow-out port 107d, and an anode side second flow-out port 107e for passing of the anode gas AG are provided to be aligned relative to the cell units 100T in the stacking direction Z. In the lower current collection plate 107, a cathode side first flow-in port 107f, a cathode side second flow-in port 107g, a cathode side first flow-out port 107h, a cathode side second flow-out port 107i, and a cathode side third flow-out port 107j for passing of the cathode gas CG are provided to be aligned relative to the cell units 100T in the stacking direction Z. In the lower current collection plate 107, the cathode side first flow-in port 107f, the cathode side second flow-in port 107g, the cathode side first flow-out port 107h, the cathode side second flow-out port 107i, and the cathode side third flow-out port 107j correspond to spaces between an outer peripheral surface of the lower current collection plate 107 and the inner surface of the air shelter 112.

The lower end plates 108 are provided as a pair and hold the paired stacks 100S from the lower side as illustrated in FIGS. 2, 3, 5 and 6 (particularly FIG. 5).

The lower end plates 108 are provided as a pair and are arranged at the lower ends of the stacks 100S side by side in the short-side direction X such that outer edges on the side from which the cathode gas CG flows out are opposed to each other. The lower end plates 108 have the same external shape as the cell units 100T excluding some portions. Both edges of each lower end plate 108 extending in the long-side direction Y are formed to extend linearly to form flow-in ports and discharge ports of the cathode gas CG. As illustrated in FIGS. 3 and 6, each lower end plate 108 is provided with paired screw holes 108m for screwing and fastening first fastening bolts 111 at both ends of an outer edge extending in the long-side direction Y on the side where the flow-in ports of the cathode gas CG are provided. As illustrated in FIGS. 3 and 6, each lower end plate 108 is provided with paired insertion holes 108n for inserting second fastening bolts 114 on the inner sides of the screw holes 108m in the long-side direction Y. The lower end plates 108 are formed to be sufficiently thicker than the cell units 100T. For example, the lower end plates 108 are made of metal and upper surfaces to be in contact with the lower current collection plates 107 are insulated by using an insulator or coating. The insulator is formed by, for example, attaching aluminum oxide to the lower end plates 108.

As illustrated in FIG. 6, in the lower end plate 108, an anode side first flow-in port 108a, an anode side second flow-in port 108b, an anode side third flow-in port 108c, an anode side first flow-out port 108d, and an anode side second flow-out port 108e for passing of the anode gas AG are provided to be aligned relative to the cell units 100T in the stacking direction Z. In the lower end plate 108, a cathode side first flow-in port 108f, a cathode side second flow-in port 108g, a cathode side first flow-out port 108h, a cathode side second flow-out port 108i, and a cathode side third flow-out port 108j for passing of the cathode gas CG are provided to be aligned relative to the cell units 100T in the stacking direction Z.

As illustrated in FIGS. 2 to 6 (particularly in FIG. 5), the upper end plate 109 hold the paired stacks 100S from the upper side.

The upper end plate 109 is arranged at upper ends of the stacks 100S. The upper end plate 109 has an outer shape obtained by integrating the lower end plates 108 in the short-side direction X to be left-right symmetric with respect to an axis extending the long-side direction Y. As illustrated in FIGS. 3 and 6, the upper end plate 109 is provided with paired insertion holes 109n for inserting the first fastening bolts 111 on both end of each of outer edges extending in the longitudinal direction Y on the sides where the flow-in ports of the cathode gas CG are provided. Unlike the lower end plates 108, the upper end plate 109 is provided with no flow-in ports or discharge ports of gas. For example, the upper end plate 109 is made of metal and a lower surface to be in contact with the upper current collection plates 106 is insulated by using an insulator or coating. The insulator is formed by, for example, attaching aluminum oxide to the upper end plate 109.

As illustrated in FIGS. 5 and 6, the springs 110 apply elastic force to the paired stacks 100S.

The springs 110 are arranged between the upper end plate 109 and the multiple recess portions 106a in the upper current collection plates 106. For example, the springs 110 are helical metal springs with creep resistance. The springs 110 may be so-called leaf springs.

As illustrated in FIGS. 3 to 5 (particularly FIG. 3), the first fastening bolts 111 applies fastening force to the paired stacks 100S on the sides where the flow-in ports of the cathode gas CG are provided.

As illustrated in FIG. 5, four first fastening bolts 111 are provided and inserted into the insertion holes 109n provided in four portions of the upper end plate 109 to be screwed and fastened to the screw holes 108m provided in two portions of each of the paired lower end plates 108. The first fastening bolts 111 apply fastening force to the paired stacks 100S arranged between the upper end plate 109 and the pair of lower end plates 108, on the sides where the flow-in ports of the cathode gas CG are provided.

As illustrated in FIGS. 2 and 4, the air shelter 112 forms the flow passages of the cathode gas CG between itself and the pair of stacks 100S.

As illustrated in FIGS. 2 and 4, the air shelter 112 covers the paired stacks 100S sandwiched between the pair of lower end plates 108 and the upper end plate 109, from above. The air shelter 112 forms the flow-in ports and the flow-out ports of the cathode gas CG for the components of the stacks 100S, by using gap portions between the inner surface of the air shelter 112 and side surfaces of the stacks 100S. The air shelter 112 is formed in a box shape and the entire lower portion and part of the side portion are opened. For example, the air shelter 112 is made of metal and the inner surface is insulated by using an insulator or coating. The insulator is formed by, for example, attaching aluminum oxide to the air shelter 112.

As illustrated in FIGS. 1 to 5, the external manifold 113 supplies gas from the outside to the multiple cell units 100T.

The external manifold 113 is arranged below the cell stack assembly 100M. The external manifold 113 has an outer shape obtained by simplifying the shape of the lower end plates 108. As illustrated in FIG. 5, the external manifold 113 is provided with screw holes 113m for screwing and fastening the second fastening bolts 114 on outer edges extending in the long-side direction Y on the side where the flow-in ports of the cathode gas CG are provided. The external manifold 113 is formed to be sufficiently thicker than the lower end plates 108. For example, the external manifold 113 is made of metal.

As illustrated in FIG. 5, in the external manifold 113, anode side first flow-in ports 113a, anode side second flow-in ports 113b, anode side third flow-in ports 113c, anode side first flow-out ports 113d, and anode side second flow-out ports 113e for passing of the anode gas AG are provided to be aligned relative to the cell units 100T in the stacking direction Z. In the external manifold 113, cathode side first flow-in ports 113f, cathode side second flow-in ports 113g, cathode side first flow-out ports 113h, cathode side second flow-out ports 113i, and cathode side third flow-out ports 113j for passing of the cathode gas CG are provided to be aligned relative to the cell units 100T in the stacking direction Z. In the external manifold 113, two cathode side first flow-in ports 113f, two cathode side second flow-in ports 113g, two cathode side first flow-out ports 113h, two cathode side second flow-out ports 113i, and two cathode side third flow-out ports 113j are provided in the short-side direction X to be left-right symmetric with respect to an axis extending the long-side direction Y.

As illustrated in FIGS. 3 to 5 (particularly FIG. 3), the second fastening bolts 114 apply fastening force to the paired lower end plates 108, on the sides where the flow-in ports of the cathode gas CG are provided.

As illustrated in FIG. 5, four second fastening bolts 114 are provided and inserted into the insertion holes 108n provided in two portions of each of the paired lower end plates 108 to be screwed and fastened to the screw holes 113m provided in four portions of the external manifold 113. The second fastening bolts 114 apply fastening force to the paired lower end plates 108, on the sides where the flow-in ports of the cathode gas CG are provided.

As illustrated in FIGS. 1, 2, and 4, the cover 115 covers the cell stack assembly 100M to protect it.

The cover 115 and the external manifold 113 sandwich the cell stack assembly 100M from the upper and lower sides. The cover 115 has a box shape and a lower portion thereof is opened. For example, the cover 115 is made of metal and an inner surface is insulated by an insulator.

Flows of Gases in Fuel Cell 100

Figure 19A:
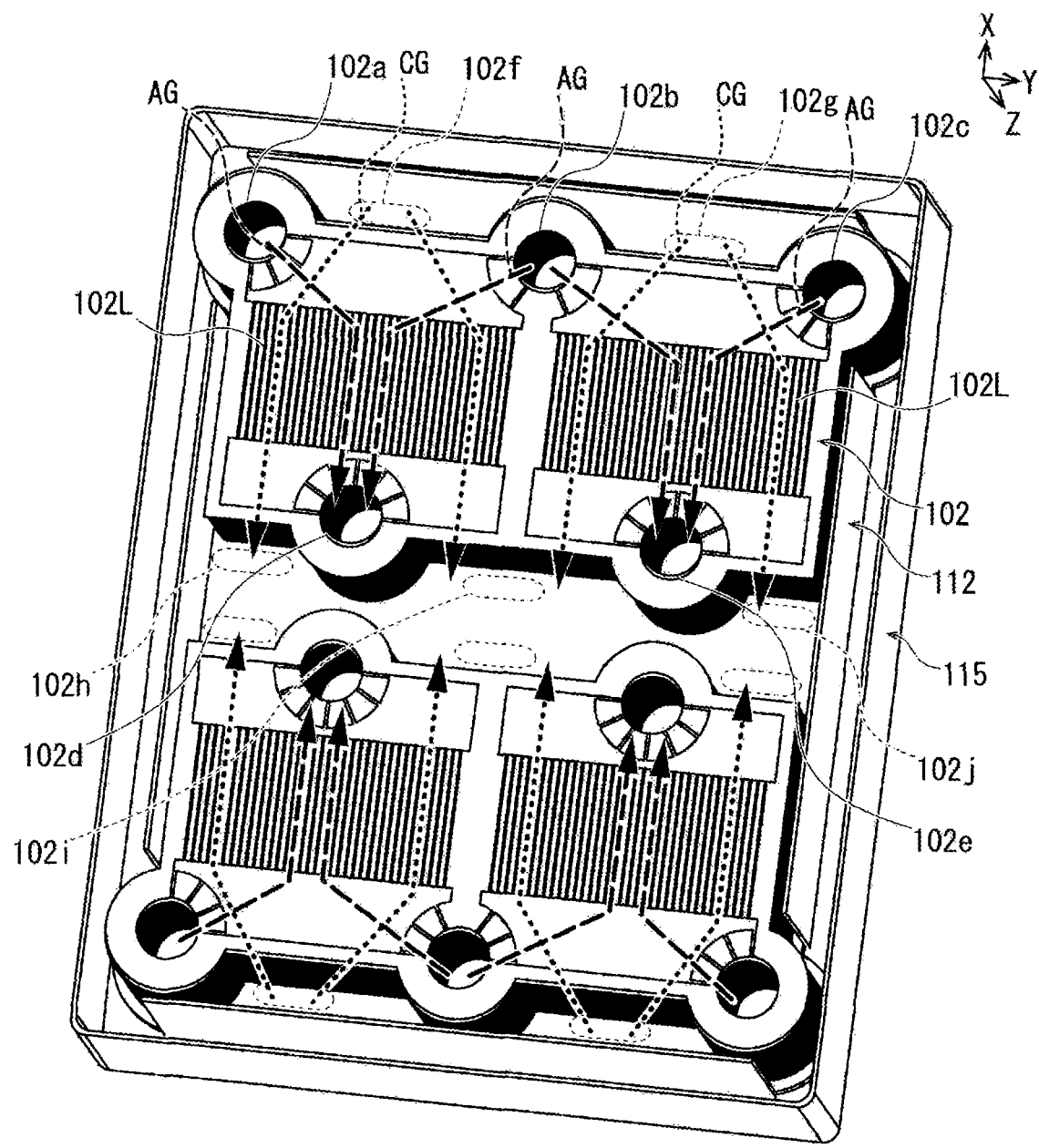
FIG. 19A is a perspective view schematically illustrating flows of an anode gas and a cathode gas in the fuel cell.
Figure 19B:
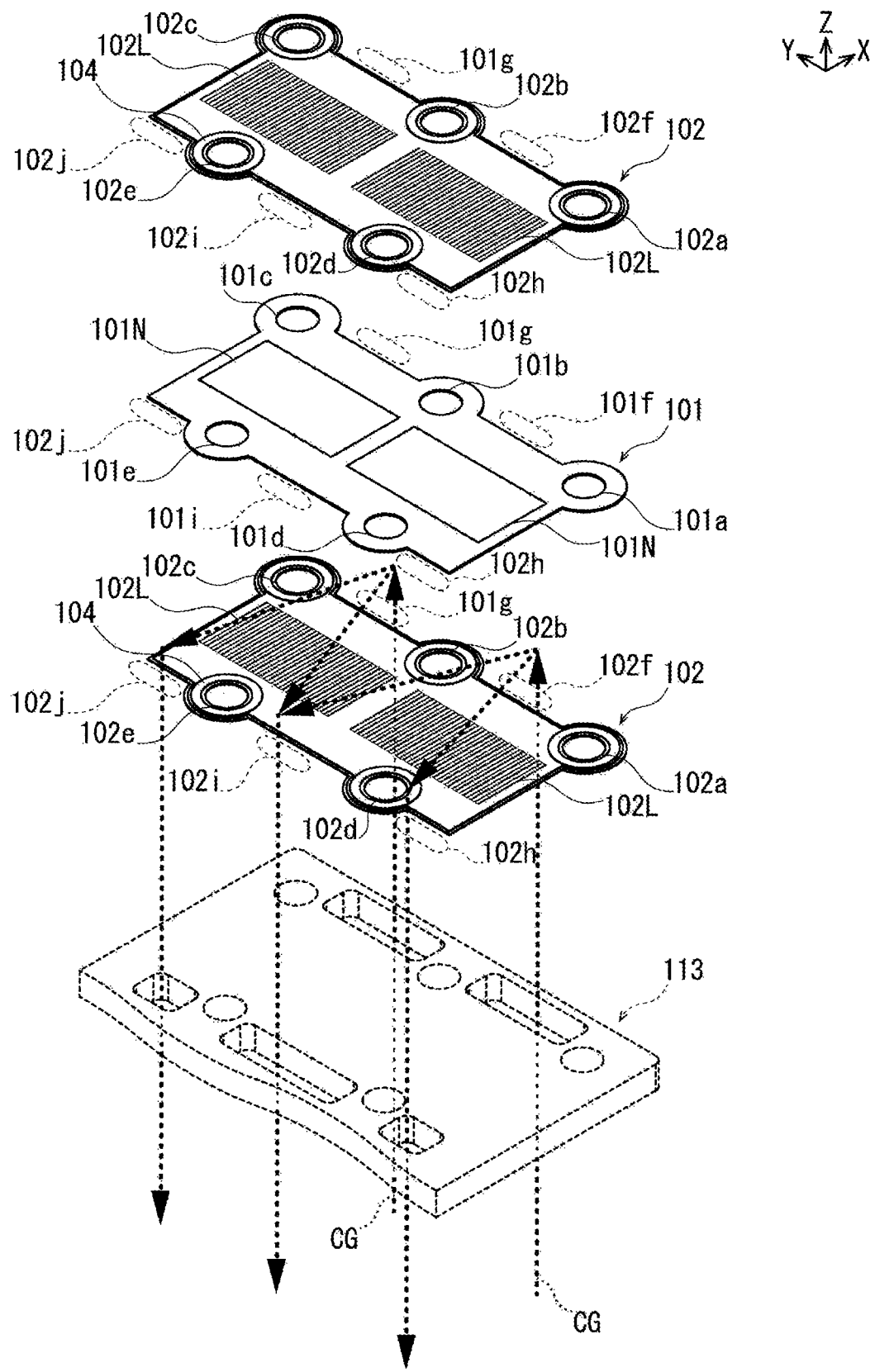
FIG. 19B is a perspective view schematically illustrating flows (one side) of the cathode gas in the fuel cell.
Figure 19C:
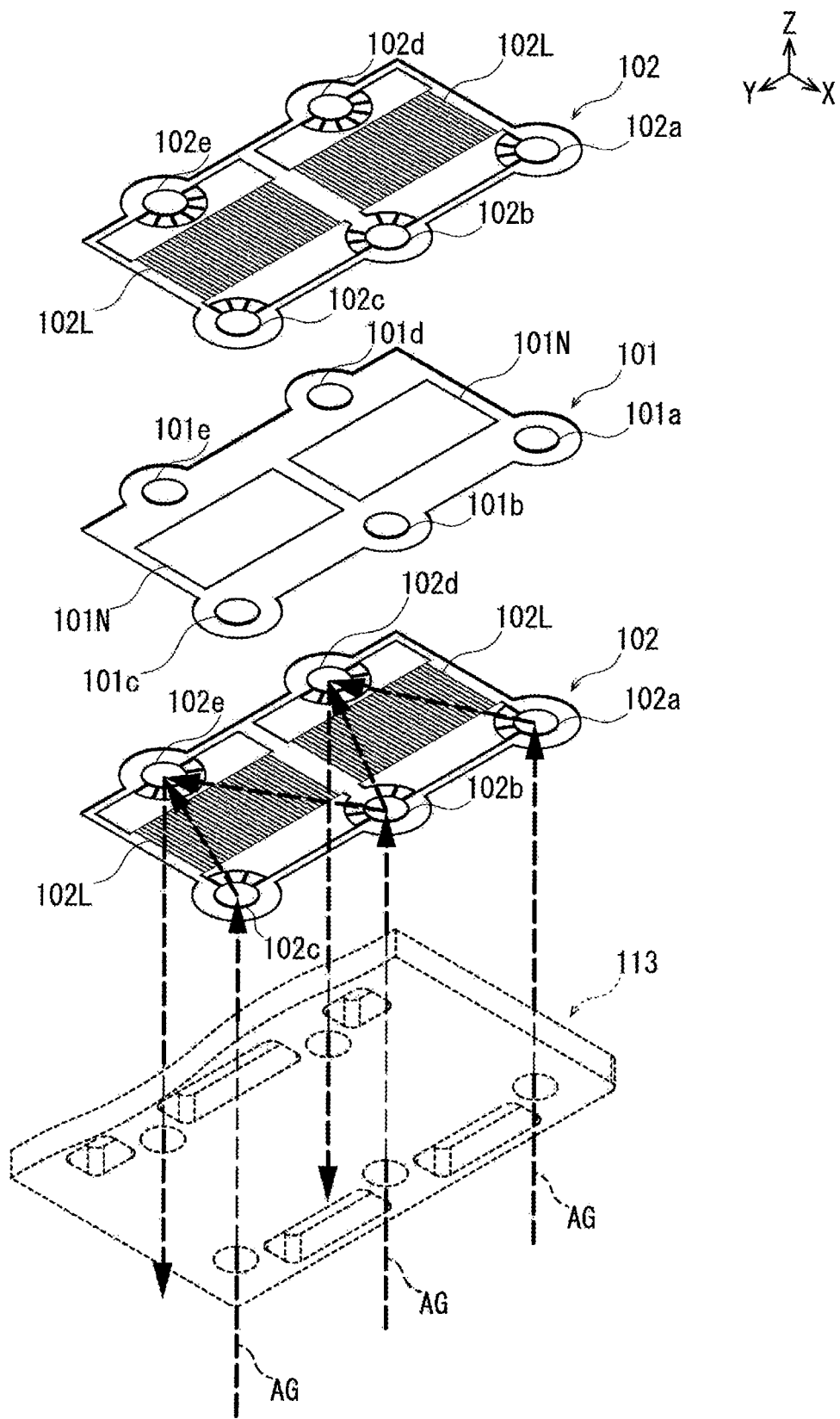
FIG. 19C is a perspective view schematically illustrating flows (one side) of the anode gas in the fuel cell.

FIG. 19A is a perspective view schematically illustrating flows of the anode gas AG and the cathode gas CG in the fuel cell 100. FIG. 19B is a perspective view schematically illustrating flows (one side) of the cathode gas CG in the fuel cell 100. FIG. 19C is a perspective view schematically illustrating flows (one side) of the anode gas AG in the fuel cell 100.

The anode gas AG passes through the flow-in ports of the external manifold 113, the lower end plate 108, the module ends 105, the separators 102, and the metal-supported cell assemblies 101 and is supplied to the anodes 101T of the power generation cells 101M. Specifically, the anode gas AG is supplied from the external manifold 113 to the upper current collection plate 106 being the terminal end while being distributed to the anode side flow passages provided in the gaps between the separators 102 and the metal-supported cell assemblies 101 alternately stacked one on top of another. Thereafter, the anode gas AG reacts in the power generation cells 101M, passes through the flow-out ports of the aforementioned components, and is discharged in a state of exhaust gas.

As illustrated in FIG. 19A, the anode gas AG is supplied to the flow passage portions 102L while being isolated from the cathode gas CG such that a path of the anode gas AG intersects a path of the cathode gas CG. In FIG. 19C, the anode gas AG passes through the anode side first flow-in port 102a, the anode side second flow-in port 102b, and the anode side third flow-in port 102c of the separator 102 located on the lower side in FIG. 19C, passes through the anode side first flow-in port 101a, the anode side second flow-in port 101b, and the anode side third flow-in port 101c of the metal-supported cell assembly 101, and then flows into the flow passage portions 102L of the separator 102 located on the upper side in FIG. 19C to be supplied to the anodes 101T of the power generation cells 101M of the metal-supported cell assembly 101. The anode gas AG having reacted in the anodes 101T flows out from the flow passage portions 102L of the separator 102 located on the upper side in FIG. 19C in the state of exhaust gas, passes through the anode side first flow-out port 101d and the anode side second flow-out port 101e of the metal-supported cell assembly 101, and passes through the anode side first flow-out port 102d and the anode side second flow-out port 102e of the separator 102 located on the lower side in FIG. 19C to be discharged to the outside.

The cathode gas CG passes through the flow-in ports of the external manifold 113, the lower end plate 108, the module ends 105, the separators 102, and the metal-supported cell assemblies 101 and is supplied to the cathodes 101U of the power generation cells 101M. Specifically, the cathode gas CG is supplied from the external manifold 113 to the upper current collection plate 106 being the terminal end while being distributed to the cathode side flow passages provided in the gaps between the metal-supported cell assemblies 101 and the separators 102 alternately stacked one on top of another. Thereafter, the cathode gas CG reacts in the power generation cells 101M, passes through the flow-out ports of the aforementioned components, and is discharged in the state of exhaust gas. The flow-in ports and the flow-out ports of the cathode gas CG in the aforementioned components are formed by the gaps between the outer peripheral surfaces of the aforementioned components and the inner surface of the air shelter 112.

In FIG. 19B, the cathode gas CG passes through the cathode side first flow-in port 102f and the cathode side second flow-in port 102g of the separator 102 located on the lower side in FIG. 19B and flows into the flow passage portions 102L of the separator 102 to be supplied to the cathodes 101U of the power generation cells 101M in the metal-supported cell assembly 101. The cathode gas CG having reacted in the cathodes 101U flows out from the flow passage portions 102L of the separator 102 located on the lower side in the FIG. 19B in the state of exhaust gas and passes through the cathode side first flow-out port 102h, the cathode side second flow-out port 102i, and the cathode side third flow-out port 102j of the separator 102 to be discharged to the outside.

Fastening Structure of Fuel Cell 100

Figure 20A:
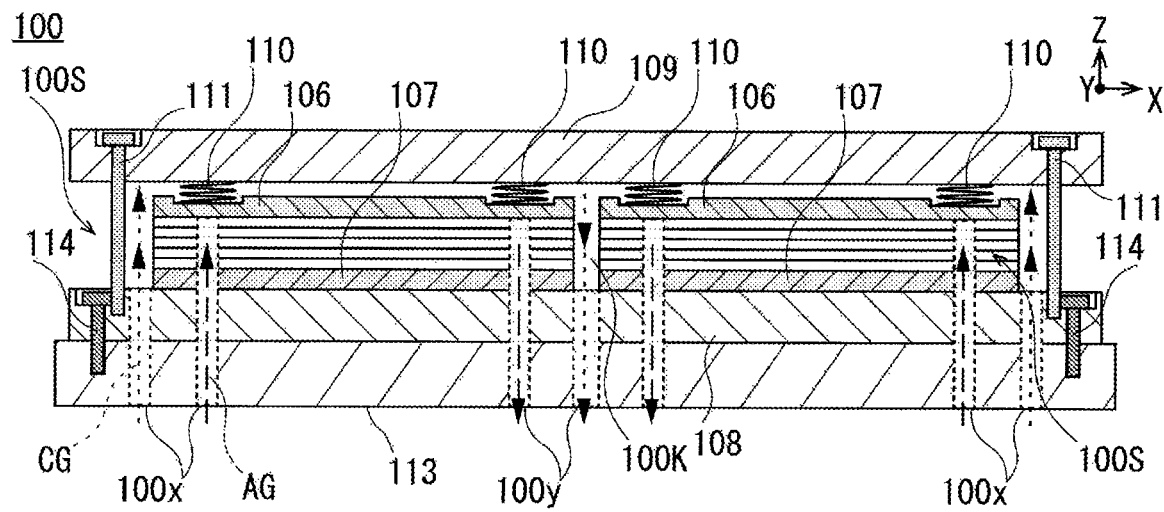
FIG. 20A is a schematic view illustrating the fuel cell of the first embodiment and is a view illustrating a state of the fuel cell before activation.
Figure 20B:
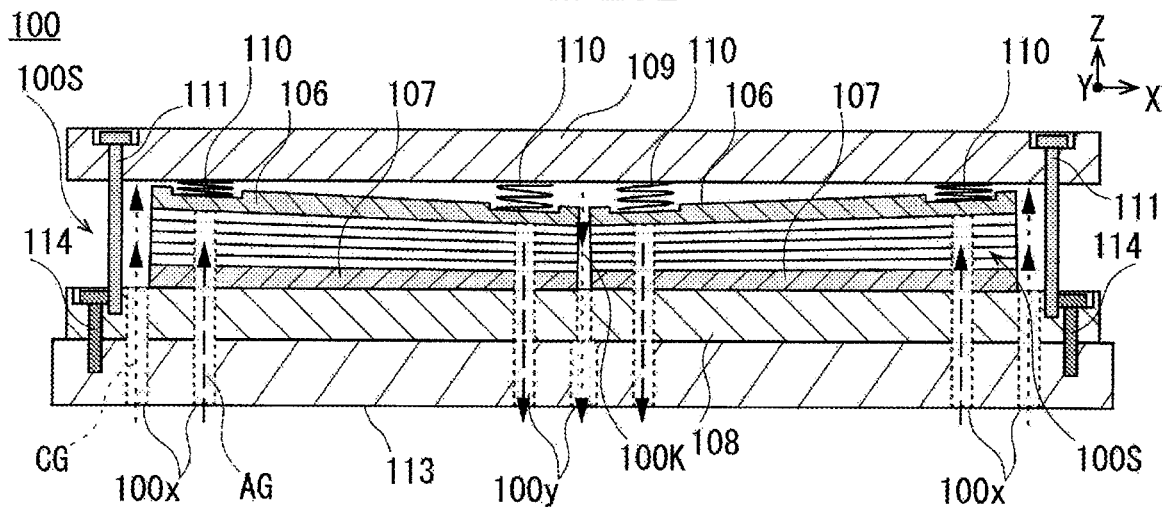
FIG. 20B is a schematic view illustrating the fuel cell of the first embodiment and is a view illustrating a state of the fuel cell in rapid temperature rise.
Figure 20C:
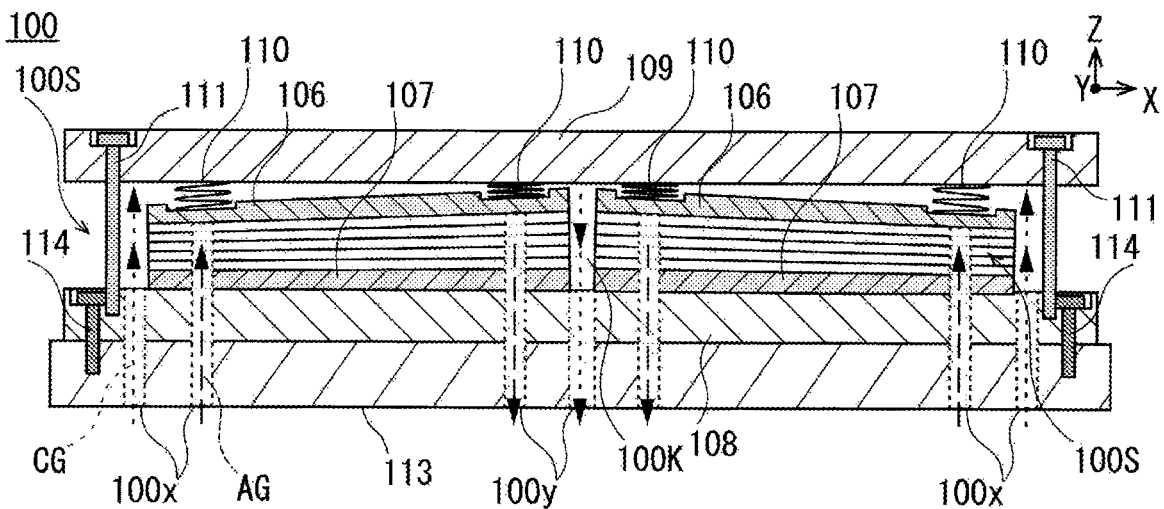
FIG. 20C is a schematic view illustrating the fuel cell of the first embodiment and is a view illustrating a state of the fuel cell in a steady operation.

FIG. 20A is a schematic view illustrating the fuel cell 100 of the first embodiment and is a view illustrating a state of the fuel cell 100 before activation. FIG. 20B is a schematic view illustrating the fuel cell 100 of the first embodiment and is a view illustrating a state of the fuel cell 100 in rapid temperature rise. FIG. 20C is a schematic view illustrating the fuel cell 100 of the first embodiment and is a view illustrating a state of the fuel cell 100 in a steady operation.

As illustrated in FIG. 20A, in the fuel cell 100 before the activation (when each stack 100S is in a state where the temperature at gas flow-in ports 100x is constantly the same as the temperature at gas flow-out ports 100y and the thickness of the stack 100S in the stacking direction Z is the same from the gas flow upstream side to the gas flow downstream side), the paired stacks 100S and the paired lower end plates 108 do not elongate.

As illustrated in FIG. 20B, in the fuel cell 100 during the rapid temperature rise (when each stack 100S is in a state where the temperature at the gas flow-out ports 100y is temporarily lower than the temperature at the gas flow-in ports 100x and expansion in the stacking direction Z on the gas flow upstream side is greater than that on the gas flow downstream side), the paired stacks 100S and the paired lower end plates 108 smoothly elongates inward in the short-side direction X. Such a configuration can be achieved because the fastening force applied to the stacks 100S between the upper end plate 109 and the multiple lower end plates 108 on the gas flow-in port 100x side is set to be greater than that on the gas flow-out port 100y side. Specifically, although a certain amount of fastening force is generated on the gas flow-in port 100x side by the first fastening bolts 111 and the like, the fastening force is relatively small on the gas flow-out ports 100y side because there are no first fastening bolts 111 and the like.

As illustrated in FIG. 20C, in the fuel cell 100 during the steady operation (when each stack 100S is in a state where the temperature at the gas flow-in ports 100x is constantly lower than the temperature at the gas flow-out ports 100y and expansion in the stacking direction Z on the gas flow downstream side is greater than that on the gas flow upstream side), the paired stacks 100S and the paired lower end plates 108 are stable in a returned state expanding outward in the short-side direction X. The temperature difference between the gas flow-out ports 100y and the gas flow-in ports 100x in the steady operation is sufficiently smaller than the temperature difference between the gas flow-out ports 100y and the gas flow-in ports 100x in the rapid temperature rise. Specifically, since the temperature differences in the lower end plates 108, the upper end plate 109, the external manifold 113, and the paired stacks 100S adjacent to each other in the short-side direction X are relatively small in the steady operation, the expansion amounts of these parts in planar directions (short-side direction X and long-side direction Y) are about the same. In the words, in the steady operation, a gap between the stacks 100S adjacent to each other in the short-side direction X is in a state similar to the state before the activation.

Operations and effects of the aforementioned first embodiment are described.

The stack structure of the fuel cell 100 is a structure in which multiple stacked bodies (stacks 100S) formed by alternately stacking the power generation cells 101M and the separators 102 are fixed to the end plates (upper end plate 109 and lower end plates 108) by using fixing means (first fastening bolts 111), the power generation cells 101M each formed by sandwiching the electrolyte 101S between the fuel electrode (anode 101T) and the oxidant electrode (cathode 101U) and configured to generate power by using the supplied gas (anode gas AG and cathode gas CG), the separators 102 each having the flow passage portions 102L, the gas flow-in ports 100x, and the gas flow-out ports 100y formed therein, the flow passage portions 102L configured to supply the gas to the power generation cells 101M, the gas flow-in ports 100x allowing the gas to flow into the flow passage portions 102L, and the gas flow-out ports 100y allowing the gas to flow out from the flow passage portions 102L. In this case, the stacks 100S are arranged side by side and a first thermal deformation absorbing portion configured to absorb thermal deformation in a direction orthogonal to the stacking direction Z is formed between the stacks 100S.

The method of absorbing thermal deformation in a fuel cell stack includes forming the power generation cell 101M by sandwiching the electrolyte 101S between the fuel electrode (anode 101T) and the oxidant electrode (cathode 101U), forming the stacked body (stack 100S) by sandwiching the power generation cell 101M between the paired separators 102, forming multiple stack 100S rows by stacking the multiple stacks 100S, arranging the multiple stack 100S rows side by side while forming a space 100K between the multiple stack 100s rows, and absorbing the thermal deformation in the direction orthogonal to the stacking direction by using the space 100K between the stack 100S rows.

In the fuel cell 100 described above, the first thermal deformation absorbing portion configured to absorb the thermal deformation in the stacks 100S in the direction orthogonal to the stacking direction Z can sufficiently reduce deformation occurring in the stacked members (including the stacks 100S).

The first thermal deformation absorbing portion preferably includes the space 100K formed between the stacks 100S arranged side by side.

The space 100K is preferably formed by fixing the stacks 100S arranged side by side to the end plate (upper end plate 109 and lower end plates 108) such that the opposed surfaces of the stacks 100S are arranged away from each other.

The fuel cell 100 described above can prevent the stacks 100S opposed to each other from coming into contact even when the stacks 100S elongates to come close to each other. Accordingly, the fuel cell 100 can sufficiently reduce the deformation occurring in the stacked members.

It is preferable that the fuel cell 100 includes the external manifold 113 having the flow ports configured to supply the gas to the power generation cells 101M, the external manifold 113 is arranged outside the end plate (upper end plate 109 and lower end plates 108), and the first thermal deformation absorbing portion is formed in the external manifold 113.

The fuel cell 100 described above can include the external manifold 113 and sufficiently reduce the deformation occurring in the stacked members (including the stacks 100S).

The fixing means for fixing the stacks 100S to the end plate (upper end plate 109 and lower end plates 108) preferably includes fastening members (first fastening bolts 111).

In the fuel cell 100 described above, the fixing means which can provide arbitrary fastening force can be implemented in a very simple configuration using the first fastening bolts 111.

It is preferable that the first fastening bolts 111 configured to fix the stacks 100S to the end plate (upper end plate 109 and lower end plates 108) fix at least the outer peripheral portions of the stacks 100S arranged side by side to the end plate (upper end plate 109 and lower end plates 108) and the end plate (upper end plate 109 and lower end plates 108) includes the upper end plate and the lower end plates sandwiching the multiple stacks 100S.

The fuel cell 100 described above can provide arbitrary fastening force in a very simple configuration using the end plates including the upper end plate and the lower end plates.

It is preferable that the stacks 100S include the gas flow-in ports 100x and the gas flow-out ports 100y, the gas flow-in ports 100x are provided in the outer peripheral portions of the stacks 100S arranged side by side, and the gas flow-out ports 100y are provided in portions of the stacks 100S including the opposed surfaces.

In the fuel cell 100 described above, elongation or shrinkage of the opposed stacks 100S can be canceled by deformation of the stacks 100S (directions in which the deformation occurs in the respective stacks 100S are opposite to each other). Accordingly, the fuel cell 100 can sufficiently reduce the deformation occurring in the stacked members.

In this case, the opposed stacks 100S has a configuration in which the gas flow-out sides are located on the inner sides. In this case, a configuration in which the outer sides are fastened by bolts to make the fastening force on the outer sides greater than the fastening force on the inner sides can be easily achieved. Specifically, when the configuration is such that the stacks are fastened on the inner sides by bolts to make the fastening force on the inner sides relatively greater unlike in the embodiment, means for applying fastening force on the outer sides becomes complex.

The fuel cell 100 preferably includes a second thermal deformation absorbing portion (springs 110) provided between the end plate (upper end plate 109 and lower end plates 108) and the stacks 100S and configured to absorb the thermal deformation in the stacking direction Z.

The second thermal deformation absorbing portion (springs 110) is preferably arranged to correspond to the gas flow-in ports 100x and the gas flow-out ports 100y of the stacks 100S.

In the fuel cell 100 described above, expansion and contraction of the springs 110 can absorb the deformation of the gas flow-in ports and the gas flow-out ports where expansion and contraction due to temperature change tend to occur. Accordingly, the fuel cell 100 can sufficiently reduce the deformation occurring in the stacked members. Particularly, in the fuel cell 100 described above, even when the thermal conductivity or coefficient of linear thermal expansion greatly varies in the stacks 100S, resilience force of the springs 110 can prevent warping or like caused by this variation.

The second thermal deformation absorbing portion (springs 110) preferably includes spring mechanisms and an amount of compression applied to the spring mechanisms in advance is greater than a difference between a portion where the amount of thermal expansion in the stacking direction Z is greatest and a portion where the amount of thermal expansion in the stacking direction Z is smallest.

The second thermal deformation absorbing portion (springs 110) is preferably arranged to correspond to films of the electrolytes 101S arranged inside the stacks 100S and have an initial compression amount or spring constant smaller than the springs arranged at the gas flow-in ports 100x or the gas flow-out ports 100y.

In the fuel cell 100 described above, since the resilience force of the springs 110 is always acting also in the case where the temperature is relatively low (for example, before the activation) for example, it is possible to avoid load loss in the portion where the thermal expansion is smallest and thereby prevent input of shear force and a decrease in power generation efficiency. Accordingly, the fuel cell 100 can sufficiently reduce the deformation occurring in the stacked members.

In the fuel cell 100, the fastening force applied to the stacks 100S between the multiple lower end plates 108 and the upper end plate 109 on the gas flow-in port side is greater than that on the gas flow-out port side.

In the fuel cell 100 described above, the fastening force applied to the stacks 100S between the multiple lower end plates 108 and the upper end plate 109 on the gas flow-in port side is defined to be greater than that on the gas flow-out port side. In the fuel cell 100 with such a configuration, the stacked members can smoothly elongate or shrink in the direction in which the deformation occurs, depending on changes in conditions (for example, an increase in temperature caused by flowing of gas). Accordingly, the fuel cell 100 can sufficiently reduce the deformation occurring in the stacked members.

In this case, means for achieving the state where the fastening force (spring reaction force of the springs 110) is gas flow-in port>gas flow-out port is naturally achieving the relationship of gas flow-in port>gas flow-out port by bolt fastening of portions near the gas flow-in ports and warping of the upper end plate 109 in an upward protruding shape. Moreover, as another means, since the expansion amount (spring compression amount) in the stacking direction Z in the rapid temperature rise is gas flow-in port>gas flow-out port, the relationship in which the fastening force is gas flow-in port>gas flow-out port is naturally achieved. As yet another means, the spring constant of the springs 110 is set to be gas flow-in port>gas flow-out port to achieve the relationship in which the fastening force is gas flow-in port>gas flow-out port, irrespective of whether it is before, during, or after the activation.

Particularly, in the fuel cell 100 described above, when the temperature of the gas increases from the gas flow-in ports toward the gas flow-out ports and the stacked members elongate, deformation in the direction from the gas flow-in ports to the gas flow-out ports is allowed and this can effectively reduce deformation occurring between the stacked members varying in the amount of deformation.

When the fastening force between the lower end plates 108 and the upper end plate 109 is gas flow-in port<gas flow-out port, the lower end plates are displaced in the planar directions (short-side direction X and long-side direction Y) on the gas flow-in port sides. However, in the rapid temperature rise, the expansion in the stacking direction is large on the gas flow-in port sides. Accordingly, on the gas flow-in port sides, the fastening force increases and the displacement in the planar directions gradually becomes difficult. As a result, stress which causes the displacement acts on the gas flow-out port sides, but since movement is restricted on the gas flow-out port sides fastened by bolts, warping deformation occurs in the lower end plates 108.

In this case, two conditions of a condition in which the fastening force between the lower end plates 108 and the manifold is gas flow-in port>gas flow-out port (referred to as condition A) and a condition in which the fastening force between the lower end plates 108 and the upper end plate 109 is gas flow-in port>gas flow-out port (referred to as condition B) are important.

When both of the condition A and the condition B are "not satisfied" (both are gas flow-in port<gas flow-out port), the lower end plates 108 and the external manifold 113 are displaced in the planar directions on the gas flow-in port sides. However, in the rapid temperature rise, the expansion in the stacking direction is great on the gas flow-in port sides. Accordingly, on the gas flow-in port sides, the fastening force increases and the displacement in the planar directions gradually becomes difficult to occur. As a result, the displacement is attempted on the gas flow-out port side but the movement is restricted on the gas flow-out port sides fastened by bolts. Thus, it is necessary to prevent the warping deformation of the lower end plates 108.

When the condition A is "satisfied" and the condition B is "not satisfied," in the rapid temperature rise, misalignment occurs between the lower end plates 108 with high thermal expansion and the upper end plate 109 with low thermal expansion because the upper end plate 109 and the lower end plates 108 are firmly fastened on the gas flow-out port sides where the displacement occurs in the lower end plates 108. Accordingly, it is necessary to prevent the warping deformation of the upper end plate 109 and the lower end plates 108 and deformation and breaking of the fastening bolts between the upper end plate 109 and the lower end plates 108.

When the condition A is "not satisfied" and the condition B is "satisfied," in the rapid temperature rise, misalignment occurs between the lower end plates 108 with high thermal expansion and the upper end plate 109 with low thermal expansion because the upper end plate 109 and the lower end plates 108 are fastened on the gas flow-in port sides where the displacement occurs in the lower end plates 108. Accordingly, it is necessary to prevent the warping deformation of the upper end plate 109 and the lower end plates 108 and the deformation and breaking of the fastening bolts between the upper end plate 109 and the lower end plates 108.

Thus, a structure in which both of the conditions A and B are "satisfied" is necessary to prevent the warping deformation of the upper end plate 109 and the lower end plates 108 (a mode in which the load loss or gas leak occurs) in the rapid temperature rise.

Moreover, in the fuel cell 100 described above, even when the thermal conductivity or coefficient of linear thermal expansion greatly varies in the stacks 100S, the lower end plates 108, and the upper end plate 109, it is possible to prevent warping or generation of shearing force in a direction intersecting the stacking direction Z caused by this variation. For example, since the sealing members 104 with relatively low coefficient of linear thermal expansion can be prevented from being pulled by the other stacked members, it is possible to protect the sealing members 104 and maintain a gas sealing performance of the sealing members 104.

In the fuel cell 100, the heated cathode gas CG to be supplied to the cathodes 101U is preferably supplied to the springs 110.

In the fuel cell 100 described above, the temperature of the springs 110 can be made close to the temperature of the stacks 100S. Moreover, when the temperature is high (for example, in the rapid temperature rise), the compression amount of the springs 110 increases and the spring constant of the springs 110 decreases and this can suppress an increase in the load generated by the springs 110. Specifically, an action of the spring compression amount increasing with an increase in the temperature of the springs 110 and an action of the spring constant decreasing with an increase in the temperature of the springs 110 are simultaneously performed. Thus, the fuel cell 100 can sufficiently reduce the deformation occurring in the stacked members.

Second Embodiment

A fuel cell 200 of the second embodiment is different from the aforementioned fuel cell 100 of the first embodiment in that an external manifold 213 is divided separately into gas flow-in portions and gas flow-out portions.

Figure 21A:
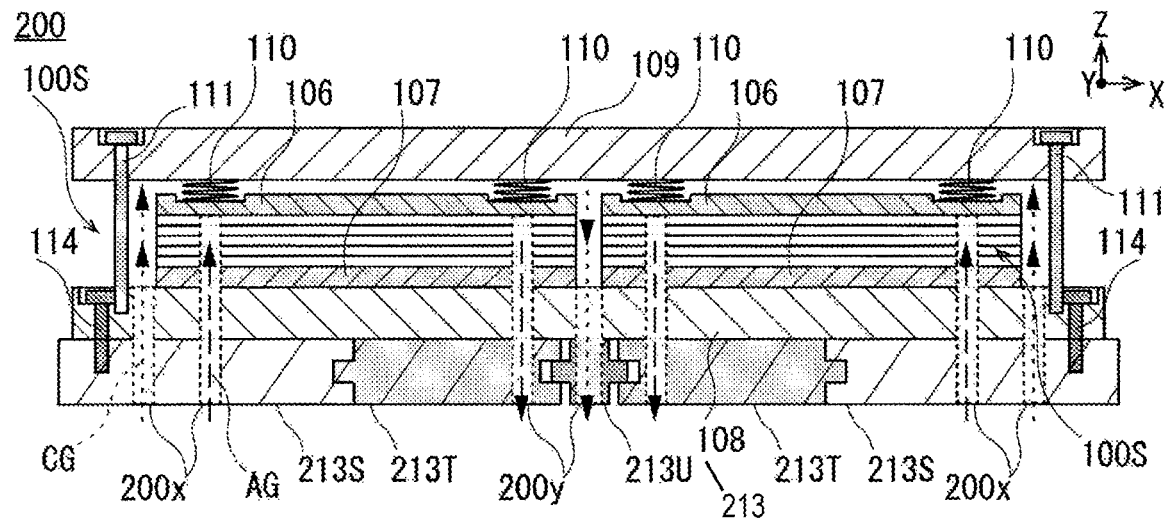
FIG. 21A is a schematic view illustrating a fuel cell of a second embodiment and is a view illustrating a state of the fuel cell before the activation.
Figure 21B:
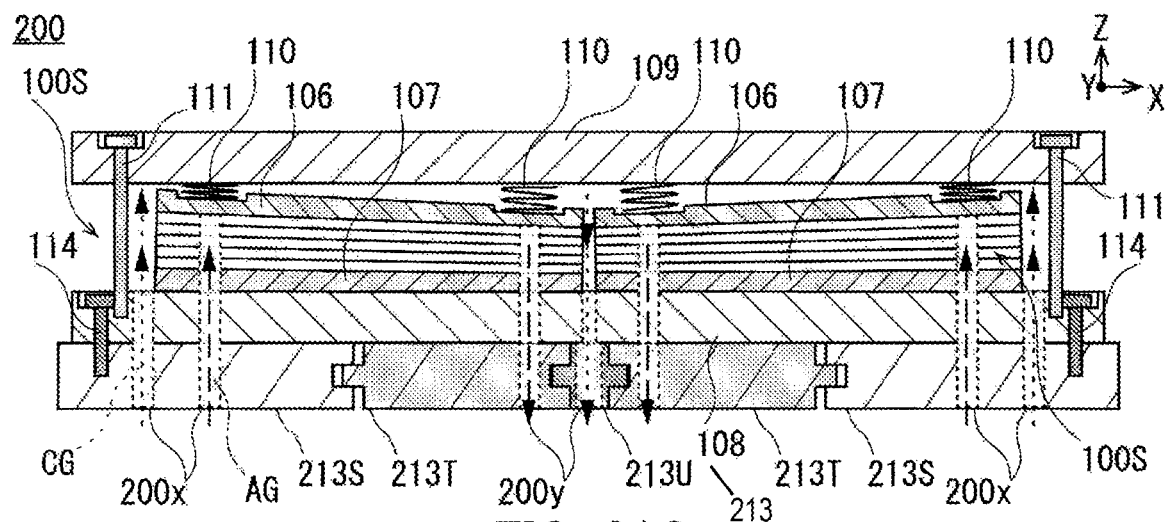
FIG. 21B is a schematic view illustrating the fuel cell of the second embodiment and is a view illustrating a state of the fuel cell in the rapid temperature rise.
Figure 21C:
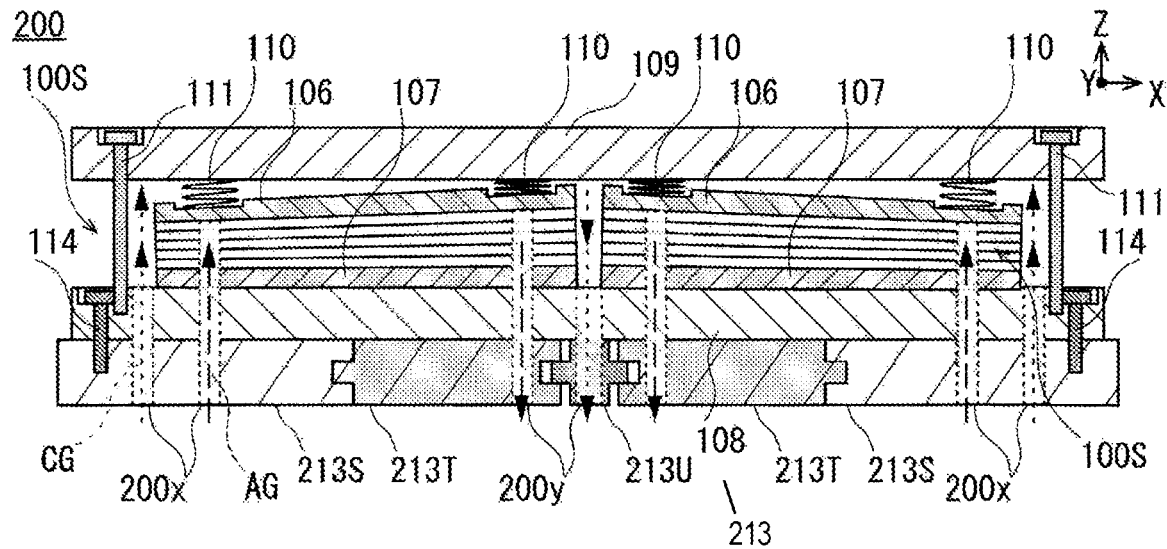
FIG. 21C is a schematic view illustrating the fuel cell of the second embodiment and is a view illustrating the state of the fuel cell in the steady operation.

FIG. 21A is a schematic view illustrating the fuel cell 200 of the second embodiment and is a view illustrating a state of the fuel cell 200 before the activation. FIG. 21B is a schematic view illustrating the fuel cell 200 of the second embodiment and is a view illustrating a state of the fuel cell 200 in the rapid temperature rise. FIG. 21C is a schematic view illustrating the fuel cell 200 of the second embodiment and is a view illustrating the state of the fuel cell 200 in the steady operation.

As illustrated in FIGS. 21A to 21C, in the fuel cell 200, a third fastening member (external manifold 213) is configured such that gas flow-in portions which allow the gas to flow into gas flow-in ports 200x and gas flow-out portions which allow the gas to flow out from gas flow-out ports 200y are divided in a direction intersecting the stacking direction Z. Specifically, the external manifold 213 includes first base portions 213S corresponding to the gas flow-in ports 200x (two first base portions 213S are arranged opposite to each other on the outer sides in the short-side direction X intersecting the stacking direction Z), second base portions 213T corresponding to the gas flow-out ports 200y (two second base portions 213T are arranged opposite to each other on the inner sides in the short-side direction X intersecting the stacking direction Z), and a third base portion 213U corresponding to the center (one third base portion 213U is arranged at the center in the short-side direction X intersecting the stacking direction Z). The external manifold 213 is joined to the paired lower end plates 108.

As illustrated in FIG. 21A, in the fuel cell 200 before the activation (when each stack 100S is in a state where the temperature at the gas flow-in ports 200x is constantly the same as the temperature at the gas flow-out ports 200y and the thickness of the stack 100S in the stacking direction Z is the same from the gas flow upstream side and to the gas flow downstream side), the first base portions 213S and the second base portions 213T are in contact with one another in the short-side direction X. The second base portions 213T and the third base portion 213U are out of contact with one another in the short-side direction X.

As illustrated in FIG. 21B, in the fuel cell 200 during the rapid temperature rise (when each stack 100S is in a state where the temperature at the gas flow-out ports 200y is temporarily lower than the temperature at the gas flow-in ports 200x and expansion in the stacking direction Z on the gas flow upstream side is greater than that on the gas flow downstream side), the stacks 100S and the like smoothly elongate inward in the short-side direction X. Accordingly, the second base portions 213T following this elongation come out of contact with the first base portions 213S and come into contact with the third base portion 213U.

As illustrated in FIG. 21C, in the fuel cell 200 during the steady operation (when each stack 100S is in a state where the temperature at the gas flow-in ports 200x is constantly lower than the temperature at the gas flow-out ports 200y and expansion in the stacking direction Z on the gas flow downstream side is greater than that on the gas flow upstream side), elongation of the stacks 100S and the like is constant. Accordingly, the second base portions 213T following this elongation come out of contact with the third base portion 213U and come into contact with the first base portions 213S again.

Operations and effects of the aforementioned second embodiment are described.

The fuel cell 200 further includes the third fastening member (external manifold 213) in which the gas flow-in portions which allow the gas to flow into gas flow-in ports and the gas flow-out portions which allow the gas to flow out from the gas flow-out ports are divided in the direction intersecting the stacking direction Z and the external manifold 213 is joined to the lower end plates 108.

In the fuel cell 200 described above, since the external manifold 213 can move in the planar direction about the gas flow-in portions and the gas flow-out ports, the shearing force can be canceled. Thus, the fuel cell 200 can sufficiently reduce the deformation occurring in the stacked members.

Third Embodiment

A fuel cell 300 of the third embodiment is different from the aforementioned fuel cell 200 of the second embodiment in that the springs 110 are arranged also in portions overlapping the power generation cells 101M in the stacking direction Z.

Figure 22A:
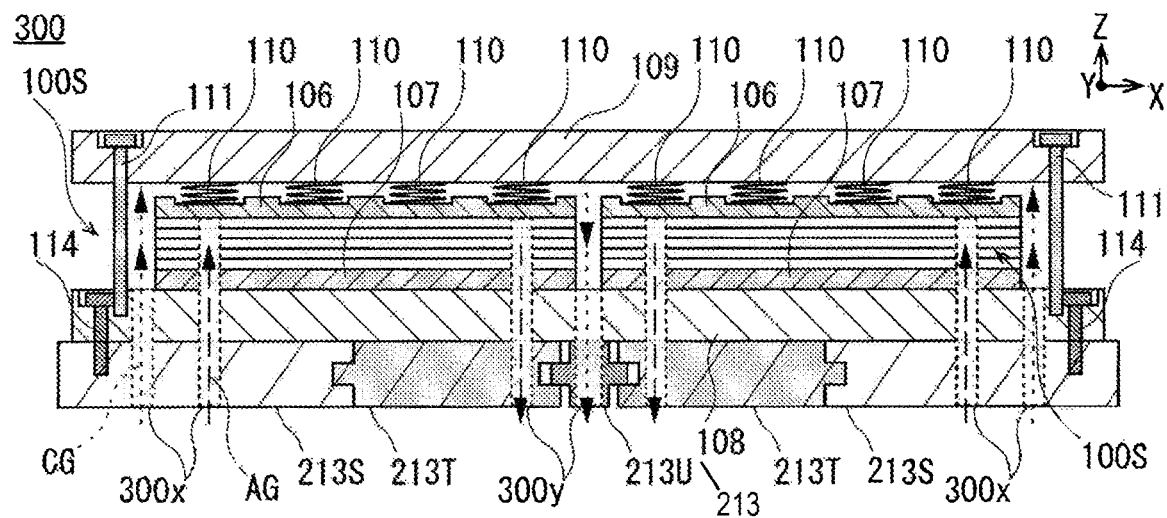
FIG. 22A is a schematic view illustrating a fuel cell of a third embodiment and is a view illustrating a state of the fuel cell before the activation.
Figure 22B:
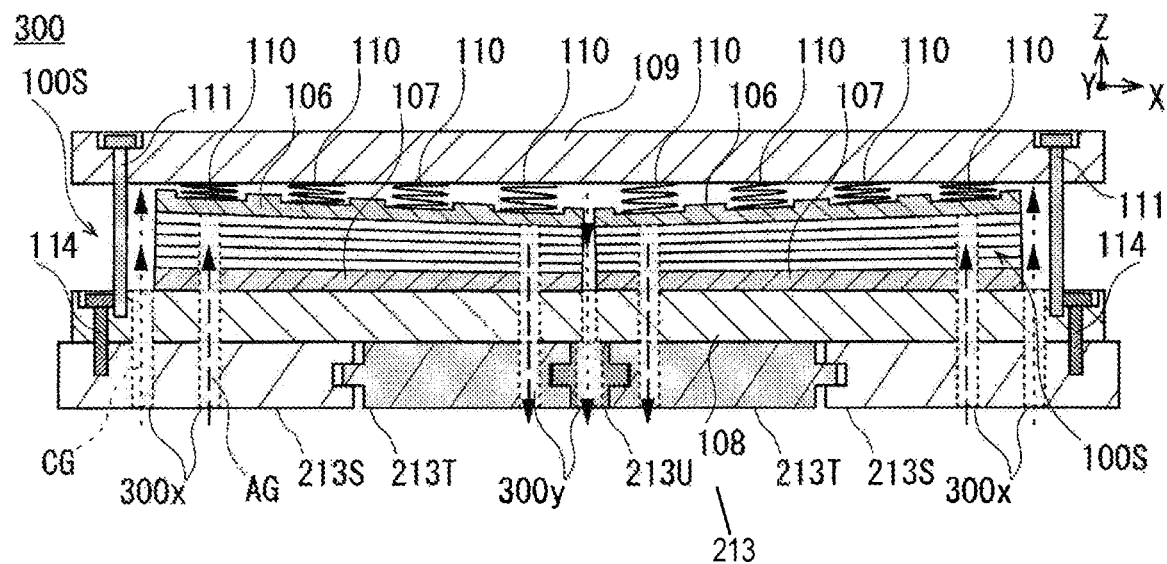
FIG. 22B is a schematic view illustrating the fuel cell of the third embodiment and is a view illustrating a state of the fuel cell in the rapid temperature rise.

FIG. 22A is a schematic view illustrating the fuel cell 300 of the third embodiment and is a view illustrating a state of the fuel cell 300 before the activation. FIG. 22B is a schematic view illustrating the fuel cell 300 of the third embodiment and is a view illustrating a state of the fuel cell 300 in the rapid temperature rise.

As illustrated in FIGS. 22A and 22B, in the fuel cell 300, multiple springs 110 are arranged in a matrix pattern also in the portions overlapping the power generation cells 101M in the stacking direction Z. As these springs 110, springs with lower resilience force than the springs 110 (corresponding to the springs 110 in the first and second embodiments) arranged at positions overlapping gas flow-in ports 300x and gas flow-out ports 300y in the stacking direction Z are selected.

Operations and effects of the aforementioned third embodiment are described.

In the fuel cell 300, the springs 110 are arranged also in the portions overlapping the power generation cells 101M in the stacking direction Z and have smaller resilience force than the springs 110 at the positions overlapping the gas flow-in ports 300x and the gas flow-out ports 300y in the stacking direction Z.

In the fuel cell 300 described above, even when the temperature gradient in the direction of gas flow is not linear, the surface pressure can be surely applied to the power generation cells 101M. In the fuel cell 300, since the resilience force of the springs 110 is always acting on the power generation cells 101M irrespective of the temperature of the springs 110, it is possible to avoid load loss in a direction intersecting the stacking direction Z of the power generation cells 101M and thereby prevent input of shear force and a decrease in power generation efficiency. Accordingly, the fuel cell 300 can sufficiently reduce the deformation occurring in the stacked members.

Moreover, in the present invention, various changes can be made based on the configurations described in the claims and these changes are also within the scope of the present invention.

In the first to third embodiments, the fuel cell is described as a Solid Oxide Fuel Cell (SOFC). However, the fuel cell may be configured as a Polymer Electrolyte Membrane Fuel Cell (PEMFC), a Phosphoric Acid Fuel Cell (PAFC), or a Molten Carbonate Fuel Cell (MCFC). In other words, the fuel cell can be applied to a Polymer Electrolyte Membrane Fuel Cell (PEMFC), a Phosphoric Acid Fuel Cell (PAFC), and a Molten Carbonate Fuel Cell (MCFC), in addition to a Solid Oxide Fuel Cell (SOFC).

The fuel cell may be formed by appropriately combining specifications of the first to third embodiments.

REFERENCE SIGNS LIST 100, 200, 300 fuel cell
100K space
100M cell stack assembly
100S stack
100T cell unit
100U joined body
100P upper module unit
100Q middle module unit
100R lower module unit
101 metal-supported cell assembly
101M power generation cell
101N metal-supported cell
101S electrolyte
101T anode
101U cathode
101V support metal
101W cell frame
101k opening portion
102 separator
102L flow passage portion
102p outer edge
102q groove
102x flat portion
102y anode side projection
102z cathode side projection
103 current collection assisting layer
104 sealing member
105 module end
106 upper current collection plate
106a recess portion
107 lower current collection plate
108 lower end plate
108m screw hole
108n insertion hole
109 upper end plate
109n insertion hole
110 spring
111 first fastening bolt
112 air shelter
113, 213 external manifold
113m screw hole
213S first base portion
213T second base portion
213U third base portion
101a, 102a, 105a, 107a, 108a, 113a anode side first flow-in port
101b, 102b, 105b, 107b, 113b, 108b anode side second flow-in port
101c, 102c, 105c, 107c, 113c, 108c anode side third flow-in port
101d, 102d, 108d, 107d, 113d, 105d anode side first flow-out port
101e, 102e, 105e, 107e, 113e, 108e anode side second flow-out port
101f, 108f, 102f, 105f, 107f, 113f cathode side first flow-in port
101g, 102g, 105g, 107g, 108g, 113g cathode side second flow-in port
101h, 102h, 113h, 105h, 107h, 108h cathode side first flow-out port
101i, 102i, 105i, 107i, 108i, 113i cathode side second flow-out port
101j, 102j, 105j, 107j, 108j, 113j cathode side third flow-out port
100x, 200x, 300x gas flow-in port
100y, 200y, 300y gas flow-out port
114 second fastening bolt
115 cover
V joining line
AG anode gas
CG cathode gas
X short-side direction (of each stack 100S in fuel cell)
Y long-side direction (of each stack 100S in fuel cell)
Z stacking direction (of fuel cell)

The invention claimed is:

1. A stack structure of a fuel cell in which stacked bodies each formed by alternately stacking power generation cells and separators are fixed to an end plate, the power generation cells each formed by sandwiching an electrolyte between a fuel electrode and an oxidant electrode and configured to generate power by using supplied gas, the separators each having a flow passage portion, a gas flow-in port, and a gas flow-out port formed therein, the flow passage portion configured to supply the gas to the power generation cell, the gas flow-in port allowing the gas to flow into the flow passage portion, the gas flow-out port allowing the gas to flow out from the flow passage portion,
wherein the end plate includes an upper end plate and a lower end plate sandwiching the stacked bodies,
wherein the stacked bodies are arranged side by side and a first thermal deformation absorbing portion configured to absorb thermal deformation in a direction orthogonal to a stacking direction is formed between the stacked bodies, and
wherein at least outer peripheral portions of the stacked bodies are arranged side by side to the end plate,
wherein the first thermal deformation absorbing portion includes a space formed between the stacked bodies arranged side by side,
wherein the stack structure comprises an external manifold arranged at an outer side of the end plate and having a flow port configured to supply the gas to the power generation cells,
wherein the upper end plate is a single plate,
wherein the lower end plate includes a pair of plates arranged at lower ends of the stacked bodies side by side in the direction orthogonal to the stacking direction such that outer edges of the pair of plates on sides from which cathode gas flows out are opposed to each other,
wherein the gas flow-in port is provided in an outer peripheral portion of each of the stacked bodies arranged side by side,
wherein the gas flow-out port is provided in a portion of each of the stacked bodies arranged side by side on sides at which surfaces of the stacked bodies are opposed to each other,
wherein a fastening force between the lower end plate and the external manifold on the gas flow-in port side is greater than that on the gas flow-out port, and
wherein a fastening force between the lower end plate and the upper end plate on the gas flow-in port side is greater than that on the gas flow-out port.

2. The stack structure of a fuel cell according to claim 1, wherein the space is formed by fixing the stacked bodies arranged side by side to the end plate such that opposed surfaces of the stacked bodies are arranged away from each other.

3. The stack structure of a fuel cell according to claim 1, wherein the first thermal deformation absorbing portion is formed in the external manifold.

4. The stack structure of a fuel cell according to claim 1, wherein the stacked bodies are fixed to the end plate using a fastening member.

5. The stack structure of a fuel cell according to claim 1, wherein
the stacked bodies include gas flow-in portions and gas flow-out portions,
the gas flow-in portions are provided in outer peripheral portions of the stacked bodies arranged side by side, and
the gas flow-out portions are provided in portions of the stacked bodies including opposed surfaces.

6. The stack structure of a fuel cell according to claim 1, comprising a second thermal deformation absorbing portion provided between the end plate and the stacked bodies and configured to absorb thermal deformation in the stacking direction.

7. The stack structure of a fuel cell according to claim 5, wherein the second thermal deformation absorbing portion is arranged to correspond to the gas flow-in portions and the gas flow-out portions of the stacked bodies.

8. The stack structure of a fuel cell according to claim 6, wherein
the second thermal deformation absorbing portion is formed of a spring mechanism, and
an amount of compression applied to the spring mechanism in advance is greater than a difference between a portion where an amount of thermal expansion in the stacking direction is greatest and a portion where the amount of thermal expansion in the stacking direction is smallest.

9. The stack structure of a fuel cell according to claim 6, wherein
the second thermal deformation absorbing portion is arranged to correspond to electrolyte membranes arranged within the stacked bodies, and
an initial compression amount or a spring constant of the second thermal deformation absorbing portion is set to be smaller than springs arranged at the gas flow-in ports or the gas flow-out ports.

10. A method of absorbing thermal deformation in a fuel cell stack, the method comprising:
forming a power generation cell by sandwiching an electrolyte between a fuel electrode and an oxidant electrode;
forming a stacked body by sandwiching the power generation cell between a pair of separators;
forming stacked body rows by stacking the stacked bodies;
arranging the stacked body rows side by side while forming a space between the stacked body rows;
fixing at least outer peripheral portions of the stacked bodies arranged side by side to an end plate for fixing the stacked bodies to the end plate, the end plate including an upper end plate and a lower end plate sandwiching the stacked bodies; and
absorbing thermal deformation in a direction orthogonal to a stacking direction by using a first thermal deformation absorbing portion which includes the space between the stacked body rows, wherein the stacked bodies comprise a portion of a stack structure,
wherein the stack structure comprises an external manifold arranged at an outer side of the end plate and having a flow port configured to supply gas to the power generation cell,
wherein the upper end plate is a single plate,
wherein the lower end plate includes a pair of plates arranged at lower ends of the stacked bodies side by side in the direction orthogonal to the stacking direction such that outer edges of the pair of plates on sides from which cathode gas flows out are opposed to each other,
wherein the stack structure includes a gas flow-in port and a gas flow-out port,
wherein the gas flow-in port is provided in an outer peripheral portion of each of the stacked bodies arranged side by side,
wherein the gas flow-out port is provided in a portion of each of the stacked bodies arranged side by side on sides at which surfaces of the stacked bodies are opposed to each other,
wherein a fastening force between the lower end plate and the external manifold on the gas flow-in port side is greater than that on the gas flow-out port, and
wherein a fastening force between the lower end plate and the upper end plate on the gas flow-in port side is greater than that on the gas flow-out port.

* * * * *